US007136753B2

(12) United States Patent  (10) Patent No.: US 7,136,753 B2
Samukawa et al.  (45) Date of Patent: Nov. 14, 2006

(54) OBJECT RECOGNITION APPARATUS FOR VEHICLE, INTER-VEHICLE CONTROL APPARATUS, AND DISTANCE MEASUREMENT APPARATUS

(75) Inventors: Yoshie Samukawa, Kariya (JP); Toyohito Nozawa, Kariya (JP); Hiroshi Ohkata, Kariya (JP); Keiji Matsuoka, Kariya (JP); Yoshiaki Hoashi, Kariya (JP); Tsutomu Natsume, Nagoya (JP); Eiji Teramura, Okazaki (JP)

(73) Assignee: Denso Corporation, Kariya (JP)

( * ) Notice: Subject to any disclaimer, the term of this patent is extended or adjusted under 35 U.S.C. 154(b) by 131 days.

(21) Appl. No.: 10/725,269

(22) Filed: Dec. 2, 2003

(65) Prior Publication Data

US 2005/0093735 A1 May 5, 2005

(30) Foreign Application Priority Data

Dec. 5, 2002 (JP) ............................. 2002-354216
Dec. 5, 2002 (JP) ............................. 2002-354217
Dec. 19, 2002 (JP) ............................. 2002-368903

(51) Int. Cl.
*G01C 3/00* (2006.01)

(52) U.S. Cl. ...................... 701/301; 701/300; 342/70; 342/85; 342/118; 356/28; 340/903

(58) Field of Classification Search ............... 701/300, 701/301, 96; 342/70, 71, 85, 104, 118, 108; 356/28; 340/903, 435, 436, 444; 367/99
See application file for complete search history.

(56) References Cited

U.S. PATENT DOCUMENTS 5,798,727 A 8/1998 Shirai et al.
5,805,527 A 9/1998 Hoashi et al.
6,018,308 A 1/2000 Shirai
6,044,321 A * 3/2000 Nakamura et al. ............ 701/96
6,249,243 B1 6/2001 Takagi (Continued)

FOREIGN PATENT DOCUMENTS

JP  A-S61020877  1/1986

(Continued)

OTHER PUBLICATIONS

Decision of Refusal from Japanese Patent Office issued on Apr. 11, 2006 for the corresponding Japanese patent application No. 2002-354216 (a copy and English translation thereof).

(Continued)

*Primary Examiner*—Jack Keith
*Assistant Examiner*—Tuan C To
(74) *Attorney, Agent, or Firm*—Posz Law Group, PLC

(57) ABSTRACT

In an object recognition apparatus for a vehicle which uses intensities of reflected waves from reflecting objects to make a recognition on whether a reflecting object is a vehicle or a non-vehicle, a plurality of transmission waves are emitted to receive a plurality of reflected waves from the reflecting objects, and a decision is made as to whether or not the reflecting object producing the plurality of reflected waves is a unitary reflecting object. If the decision shows a unitary reflecting object, the highest intensity of intensities of the reflected waves from the unitary reflecting object is compared with a reference intensity to makes a decision on whether the reflecting object is a vehicle or a non-vehicle. This enables univocally making a decision for each unitary reflecting object as to whether the reflecting object is more likely to be a vehicle or to be a non-vehicle, thus improving the recognition accuracy.

6 Claims, 21 Drawing Sheets

U.S. PATENT DOCUMENTS

| | | |
|---|---|---|
| 6,593,873 B1 | 7/2003 | Samukawa et al. |
| 6,661,370 B1 | 12/2003 | Kishida et al. |
| 6,753,805 B1 | 6/2004 | Nakanishi et al. |
| 6,756,933 B1 * | 6/2004 | Ishii et al. .................... 342/70 |
| 6,809,680 B1 * | 10/2004 | Tojima ........................ 342/70 |
| 6,810,330 B1 * | 10/2004 | Matsuura ................... 701/301 |
| 6,900,754 B1 * | 5/2005 | Ono et al. .................. 342/158 |
| 2002/0032515 A1 * | 3/2002 | Nakamura et al. ............ 701/96 |
| 2003/0083818 A1 * | 5/2003 | Tojima ...................... 701/301 |
| 2003/0142007 A1 | 7/2003 | Ono et al. |

FOREIGN PATENT DOCUMENTS

| | | |
|---|---|---|
| JP | A-UM-H03-121399 | 12/1991 |
| JP | A-H06-109841 | 4/1994 |
| JP | A-H06-109842 | 4/1994 |
| JP | A-H07-191143 | 7/1995 |
| JP | A-H09-178848 | 7/1997 |
| JP | 9-236661 | 9/1997 |
| JP | 11-38141 | 2/1999 |
| JP | A-H11-038142 | 2/1999 |
| JP | A-2000-180540 | 6/2000 |
| JP | A-2001-183462 | 7/2001 |
| JP | 2002-22827 | 1/2002 |
| JP | A-2002-006040 | 1/2002 |
| JP | A-2002-014165 | 1/2002 |
| JP | 2002-40137 | 2/2002 |
| JP | 2002-40139 | 2/2002 |
| JP | A-2002-099907 | 4/2002 |
| JP | A-2002-122669 | 4/2002 |
| JP | 2002-131433 | 5/2002 |
| JP | A-2002-341020 | 11/2002 |
| JP | A-2002-341021 | 11/2002 |
| JP | A-2003-177178 | 6/2003 |
| JP | A-2003-185738 | 7/2003 |

OTHER PUBLICATIONS

Notification of Reasons for Rejection issued from Japanese Patent Office issued on Dec. 6, 2005 for the corresponding Japanese patent application No. 2002-354216 (a copy and English translation thereof).

Two (2) Office Communications from JP Patent Office dated Jun. 28, 2005.

* cited by examiner

OBJECT RECOGNITION APPARATUS FOR VEHICLE, INTER-VEHICLE CONTROL APPARATUS, AND DISTANCE MEASUREMENT APPARATUS

BACKGROUND OF THE INVENTION

1) Field of the Invention

The present invention relates to an object recognition apparatus for a vehicle, made to emit (radiate) a plurality of transmission waves throughout a predetermined angular range in vertical and horizontal (lateral or width) directions of the vehicle for recognizing a reflecting object, such as a preceding vehicle (vehicle ahead), existing in a forward direction of one's vehicle (this vehicle) on the basis of reflected waves thereof, and to an inter-vehicle control apparatus designed to control the distance between oneself and the preceding vehicle recognized, and further to a distance measurement apparatus.

2) Description of the Related Art

So far, as exemplified by Japanese Patent Laid-Open No. 2002-40139, there has been proposed an object recognition apparatus which emits a transmission wave(s), such as optical wave or millimetric wave, in a forward direction of one's vehicle to detect the reflected wave for recognizing an object in the forward direction thereof. This type of apparatus is applicable to, for example, an apparatus made to detect a decrease in spacing from a preceding vehicle or the like and to issue an alarm or an apparatus designed to control the speed of oneself for keeping the inter-vehicle distance with respect to a preceding vehicle, that is, it is utilized for the recognition of a preceding vehicle forming a counterpart of an object of control.

The foregoing object recognition apparatus is designed such that, for example, through the use of a laser radar sensor, a plurality of laser beams are radiated in a forward direction of one's vehicle throughout a predetermined angular range in vertical and horizontal directions of the one's vehicle to recognize a vehicle ahead three-dimensionally on the basis of the reflected light thereof. In this case, if a reflecting object exists at a height or in a range where normal vehicles do not appear, there is a need to make a decision indicative of a non-vehicle (object other than vehicles). Therefore, the identification on a non-vehicle is made through the use of a non-vehicle decision map for the decision between a vehicle and a non-vehicle. As shown in FIG. 25, the non-vehicle decision map is a three-dimensional map in which, for a discrimination between a vehicle and a non-vehicle, light-reception intensity areas on reflected light are set in a state associated with existence regions of a reflecting object with vertical, horizontal and forward directions being taken as X axis, Y axis and Z axis, respectively.

A description will be given hereinbelow of a method for making a discrimination between a vehicle and a non-vehicle through the use of this non-vehicle decision map. First, a decision is made as to which of areas of the non-vehicle decision map the measurement (range) data from a laser radar sensor corresponds to. At this time, if the measurement data pertains to a non-vehicle range, this measurement data is deleted. On the other hand, if the measurement data is involved in an range other than non-vehicle, the measurement data is preserved and is outputted to an inter-vehicle control ECU which takes charge of the implementation of a decision on a preceding vehicle and inter-vehicle control.

As shown in FIG. 25, the non-vehicle decision map is divided into an area in the vicinity of the center thereof, an area around the center area (area in the vehicle of the center thereof) and a lowermost area in the X-axis and Y-axis directions, and the correspondence relationship between a position in the Z-axis direction and a light-reception intensity is set as indicated by (a) to (c) in a state associated with each of these areas. In the X-axis and Y-axis directions, the area in the vicinity of the center shows the correspondence relationship indicated by (b), the area around the center area shows the correspondence relationship indicated by (a), and the lowermost area shows the correspondence relationship indicated by (c).

A description will be given hereinbelow of the correspondence relationship between a position in the Z-axis direction and a light-reception intensity. In the correspondence relationship indicated by (a) to (b), basically, within a predetermined distance range in the Z-axis direction, a predetermined light-reception intensity range is taken as a non-vehicle area, and the range out of that range is taken as a vehicle area. This is because it is considered that a vehicle differs in reflection intensity from a non-vehicle and the reflection intensity of the vehicle is higher than that of the non-vehicle. Moreover, a more appropriate discrimination between a vehicle and a non-vehicle can be made in a manner such that a light-reception intensity for a discrimination between a vehicle and a non-vehicle is set for each reflection object existence area. That is, in an area showing a high possibility of the existence of a vehicle, the measurement data are preserved even if the light-reception intensity is relatively low and, on the other hand, in an area showing a low possibility of the existence of a vehicle, the measurement data are deleted except that the light-reception intensity is relatively high. This enables only the measurement data on a reflecting object showing a high possibility on the existence of a vehicle to be outputted to the inter-vehicle control ECU.

As mentioned above, the conventional object recognition apparatus is designed to successively emit a plurality of laser beams from a laser radar sensor for, in response to the detection of the reflected light thereof, making a decision, through the use of a non-vehicle decision map, as to whether the light-reception intensity of the reflected light corresponds to a vehicle or a non-vehicle.

There is a problem which arises with the decision method of the conventional object recognition apparatus, however, in that there is a possibility of the accuracy of the decision on the vehicle/non-vehicle being sufficiently secured. For example, in a case in which mud or the like sticks to a portion of a vehicle to make it dirty, all the reflected light from the vehicle do not show a high light-reception intensity. That is, measurement data on reflected light having a low light-reception intensity can be included even if the reflecting object is a vehicle. In this case, if a decision is made that the measurement data on the reflected light having a low light-reception intensity corresponds to a non-vehicle and this measurement data is deleted, the measurement data for the reflecting object to be decided as a vehicle becomes in short supply, which can make it difficult to recognize a vehicle with high accuracy.

Furthermore, Japanese Patent Laid-Open No. HEI 11-38141 discloses the scanning on a predetermined two-dimensional area in vertical and horizontal directions. In the case of the scanning on a predetermined two-dimensional area with the emission of a plurality of laser beams (line emission), if a relative large object such as a preceding vehicle exists in front, this object reflects a plurality of laser beams which in turn, are detected by a laser radar sensor. When the laser radar sensor detects the plurality of reflected lights, there is a need to make a discrimination as to whether the reflecting lights are produced by a unitary (same) object or by different objects. That is, in order to correctly recognize each object, there is a need to sort out the reflected lights for each object.

For this reason, in a conventional vehicle object recognition apparatus, positions of the reflecting objects in horizontal directions and distances thereto are calculated on the basis of the reflected light (measurement) data acquired through the line emission, and when the positions of the reflecting objects and the distances thereto are in close conditions, they are presumed as a unitary reflecting object to produce presegment data by unifying them for each emission line. Moreover, the presegment data obtained through the respective line emissions are compared with each other, and when they stand close in position in the vertical direction and distance, they are unified to produce definitive (normal) segment data.

However, in the case of the conventional vehicle object recognition apparatus, since, on the basis of only the position (position in a lateral direction, position in a vertical direction and distance) of a reflecting object, a decision is made as to whether or not the reflecting object is a unitary object, the following problems arise.

For example, even in a case in which a plurality of reflected lights are detected from one preceding vehicle, there is a case in which the intensity of the reflected light from a vehicle body is remote from the sufficiency. Therefore, there is a possibility that the detection of the reflected light from the vehicle body becomes unstable and, in this case, the measurement data on the preceding vehicle becomes unstable.

In addition, in the case of a mere decision on a unitary object on the basis of only the position of the reflecting object, there is a threat of separate objects being taken as a unitary object. For example, in a case in which a stationary thing such as a signboard is at a position above a preceding vehicle or at a side thereof, the preceding vehicle can be recognized as being integrated with the stationary object. In this case, there is a possibility that this object is not correctly recognized as a preceding vehicle because of being different in size from a vehicle.

Moreover, so far, there has been proposed a measurement method based on a signal intensity (strength) of a reflected wave from an object (for example, Japanese Patent Laid-Open No. 2002-22827). According to this measurement method (decision method), for example, in a case in which a pulse wave is emitted to a vehicle existing at a short distance from one's vehicle, a pulse width (deletion pulse width) of a reflected wave is set on the basis of a signal intensity which will develop when normal reflection occurs and is compared with pulse widths of reflected waves detected by the apparatus so that the reflected waves with a pulse width shorter than the deletion pulse width is unemployed for the distance measurement. Thus, if a vehicle is assumed as an object of measurement, the distance measurement is made apart from the detection results on the reflected wave from objects existing at roadsides, or the like, which show relatively low signal intensities.

However, the above-mentioned conventional decision method based on the pulse width of the reflected wave creates the following problems. For example, in a case in which a reflected wave (L) looking like two reflected waves (L1 and L2) overlap is detected as shown in FIG. 23, the pulse width (T) of this reflected wave (L) becomes larger than a deletion pulse width (W) and, hence, the distance to the object is measured on the basis of the detection result on the reflected wave (L).

Such a reflected wave (L) with a large pulse width, which looks like two reflected waves overlap, appears, for example, when a pulse wave emitted is reflected from an object of measurement after passing through spray of water, black smoke or the like and a reflected wave from the object is detected together with a reflected wave from the spray of water or black smoke. Assuming that the reflected wave from the object is the reflected wave (L2), it is required that the pulse width of this reflected wave (L2) and the deletion pulse width (W) be compared in magnitude with each other to make a decision as to whether or not the reflected wave from the object is to be used for the distance measurement.

However, in the case of the conventional decision method, since the decision as to whether or not the reflected wave is to be used for the distance measurement is made on the basis of the relationship in magnitude between the pulse width (T) of the reflected wave (L) and the deletion pulse width (W), even a reflected wave, which cannot provide a sufficient signal intensity, results in having a pulse width corresponding to a high signal intensity due to the environmental influence such as the spray of water or black smoke, and the distance can be calculated on the basis of the resultant reflected wave (L).

SUMMARY OF THE INVENTION

It is therefore an object of the present invention to provide a vehicle object recognition apparatus capable of enhancing the recognition accuracy in utilizing the intensity of reflected light from a reflecting object for recognizing whether the reflecting object is a vehicle or a non-vehicle, an inter-vehicle control apparatus capable of, when the reflecting object is a preceding vehicle, appropriately controlling the inter-vehicle distance to the preceding vehicle through the use of the intensity of the reflected light therefrom, and a distance measurement apparatus capable of making an accurate decision as to whether or not a reflected wave detected is to be used for the distance measurement.

For this purpose, an object recognition apparatus for a vehicle according to an aspect of the present invention comprises radar means for emitting a plurality of transmission waves throughout a predetermined angular range in each of vertical and horizontal directions of the vehicle to, on the basis of reflected waves thereof, detect distances to reflecting objects, angles in the vertical and horizontal directions and intensities of the reflected waves, decision means for, when a plurality of reflecting objects satisfy a predetermined unity condition, making a decision that the plurality of reflecting objects constitute a unitary reflecting object (same reflecting object), selection means for selecting the highest intensity of intensities of reflected waves corresponding to the reflecting objects decided to be a unitary reflecting object in the decision means, and recognition means for recognizing the reflecting objects on the basis of the distance and the angles in the vertical and horizontal directions which are the detection results acquired by the radar means and for enhancing a probability of a reflecting object being recognized as a non-vehicle when the highest intensity selected by the selection means is below a predetermined reference intensity.

Thus, in this vehicle object recognition apparatus, when a plurality of transmission waves are emitted and a plurality of reflected waves are received, a decision is first made as to whether or not the reflecting object causing the plurality of reflected waves is a unitary object. If this decision shows the unitary object, the maximum intensity of the intensities of the reflected waves from the reflecting objects constituting the unitary reflecting object is compared with a reference intensity for a discrimination between a vehicle and a non-vehicle. This enables a decision to be univocally made for each unitary reflecting object as to whether the unitary reflecting object is more likely to be a vehicle or a non-vehicle. Moreover, since the decision is made on the basis of the maximum reflected wave intensity from the reflecting objects, for example, even if a portion of a vehicle is made dirty, a precise judgment becomes feasible.

In this configuration, preferably, the predetermined reference intensity is set at a lower value for a long distance to the reflecting object than for a short distance thereto. This is because, even if the reflection intensities of the reflecting objects are equal to each other, the reflected light intensity lowers as the distance thereto becomes longer.

In addition, preferably, the object recognition apparatus further comprises shape calculation means for calculating a shape of the reflecting object on the basis of the distance and the angles in the vertical and horizontal directions detected by the radar means, and the recognition means enhances the probability of the reflecting object being recognized as a non-vehicle when the highest intensity is lower than the predetermined reference intensity and the shape of the reflecting object is different from a vehicle shape. Thus, since consideration is paid to the shape of the reflecting object in addition to the intensity of the reflected wave, a decision as to whether reflecting object is more likely to be a vehicle or a non-vehicle can be made with higher accuracy.

Still additionally, preferably, in this object recognition apparatus, when the width of the shape of the reflecting object is shorter than the width of the vehicle shape, the recognition means recognizes that the shape of the reflecting object is different from the vehicle shape. This is because, when the width of the reflection object is smaller than the width the vehicle, in most cases the reflecting object is a non-vehicle such as tree or grass planted in roadsides, or splash or dust blown up over a road.

Yet additionally, preferably, in this object recognition apparatus, on the basis of the highest intensity of the reflected wave, the recognition means conducts processing of enhancing the probability of the reflecting object being recognized as a non-vehicle when the distance to the reflecting object is shorter than a predetermined short distance. This is because, even if the maximum reflected wave intensity is selected, the intensity of the reflected wave lowers as the distance to the reflecting object increases, which makes it difficult to make a discrimination between a vehicle and a non-vehicle.

Furthermore, an inter-vehicle control apparatus according to another aspect of the present invention comprises radar means for emitting a plurality of transmission waves throughout a predetermined angular range in each of vertical and horizontal directions of a vehicle to, on the basis of reflected waves thereof, detect distances to reflecting objects, angles in the vertical and horizontal directions and intensities of the reflected waves, decision means for, when a plurality of reflecting objects satisfy a predetermined unity condition, making a decision that the plurality of reflecting objects constitute a unitary reflecting object, selection means for selecting the highest intensity of intensities of reflected waves corresponding to the reflecting objects decided to be a unitary reflecting object in the decision means, recognition means for, on the basis of at least a shape of the reflecting object, recognizing that the reflecting object is a preceding vehicle, calculation means for calculating a relative speed with respect to the preceding vehicle in time series on the basis of a variation of the distance to the preceding vehicle and for calculating an average relative speed by averaging a plurality of relative speed calculated in time series, inter-vehicle control means for implementing inter-vehicle control on the basis of the distance to the preceding vehicle and the average relative speed, and stability decision means for making a decision as to a recognition stability on the preceding vehicle on the basis of whether or not the highest intensity of the reflected wave selected by the selection means with respect to the preceding vehicle exceeds a predetermined reference intensity, wherein, when the stability decision means makes a decision that the preceding vehicle recognition stability is high, the calculation means enhances the influence of the latest relative speed in calculating the average relative speed.

Thus, in this inter-vehicle control apparatus, when the highest intensity of the reflected wave from the reflecting object recognized as a preceding vehicle exceeds a predetermined reference intensity, a decision is made that the recognition stability is high. That is, a vehicle has a higher reflection intensity than that of a non-vehicle and, if the highest intensity of the reflected wave detected in fact has a level obviously distinguishable from the non-vehicle, the preceding vehicle can continuously be recognized in a state distinguished from other reflecting objects.

Moreover, since the S/N ratio on the reflected wave intensity increases in the case of a high reflection intensity, the accuracy of the measurement data such as the distance from the preceding vehicle increases.

In this case, for controlling the inter-vehicle distance relative to the preceding vehicle to a target distance, there is a need to calculate a relative speed which is a difference in speed (one's vehicle speed—preceding vehicle speed) between the one's vehicle and the preceding vehicle. That is, for approaching the preceding vehicle, the traveling speed of the one's vehicle is controlled so that the relative speed takes "plus", whereas, for lengthening the distance to the preceding vehicle, the control is implemented so that the relative speed takes "minus". Usually, for the calculation of the relative speed, the average relative speed is calculated on the basis of a plurality of relative speeds calculated in time series in order to eliminate the influence of the noise, measurement error and the like. Moreover, the inter-vehicle control is implemented on the basis of this average relative speed. However, in the case of the implementation of the inter-vehicle control based on the average relative speed, the shifting from the actual relative speed occurs, which leads to a degradation of the response performance in the inter-vehicle control.

Therefore, in this inter-vehicle control apparatus, in a case in which the accuracy of the measurement data improves, the average relative speed is calculated in a state where the degree of the influence of the latest relative speed is enhanced. This enables the average relative speed to approach the latest relative speed, thereby improving the response performance in the inter-vehicle control.

Still moreover, the calculation means decreases the number of relative speeds to be used in calculating the average relative speed, which enhances the influence of the latest relative speed with respect to the average relative speed. Yet moreover, in calculating the average relative speed, a weighting-averaged relative speed is calculated in a state where the weighting factor for the latest relative speed is increased. This also can increase the influence of the latest relative speed with respect to the average relative speed.

Furthermore, preferably, the stability decision means makes a decision on the recognition stability on the preceding vehicle on the basis of whether or not a time variation of the shape of the reflecting object corresponding to the preceding vehicle is smaller than a predetermined reference value. When, in addition to the maximum intensity of the reflected wave from the reflecting object subjected to the unity decision, the time variation of the shape of the reflecting object is taken into consideration, the decision accuracy on the recognition stability is improvable. In this connection, concretely, the time variation of the shape of the reflecting object may be determined on the basis of whether or not a variation of the width of the reflecting object falls within a predetermined length or whether or not a variation of the depth of the reflecting object falls within a predetermined length.

Still furthermore, preferably, the stability decision means makes a decision on the recognition stability on the preceding vehicle on the basis of whether or not the position of the preceding vehicle resides within a predetermined distance range in a lateral direction with respect to an extension of the one's vehicle in its traveling (forward) direction. This is because the possibility of the preceding vehicle being out of an emission range of the radar means becomes lower as the preceding vehicle is closer to the extension of the one's vehicle in the traveling direction and the relative speed can be calculated with the highest accuracy on the basis of the measurement data.

Yet furthermore, it is also appropriate that the stability decision means makes a decision on the recognition stability on the preceding vehicle on the basis of a period of time for which the preceding vehicle is continuously recognized. In a case in which the duration of the actual vehicle recognition is long, the possibility of stable recognition becomes high.

In addition, an object recognition apparatus for a vehicle according to a further aspect of the present invention comprises radar means for emitting a plurality of transmission waves throughout a predetermined angular range in a forward direction of the vehicle to, when each of the transmission waves are reflected by a reflecting object and the reflected wave is received, output a reception signal (received signal) corresponding to an intensity of the reflected wave, and recognition means for recognizing an object existing in the forward direction of the vehicle on the basis of a result of the transmission/reception by the radar means, wherein the radar means includes distance calculation means for calculating a distance to a reflecting object in an emission direction of the transmission wave on the basis of a time length from the emission of the transmission wave to the reception of the reflected wave and intensity calculation means for calculating an intensity of the reflected wave on the basis of the reception signal, and the recognition means includes first unification for, when the radar means receives a plurality of reflected waves, unifying reflecting objects producing said plurality of reflected waves to recognize them as the same reflecting object in a case in which a difference between distances calculated on the basis of the plurality of reflected waves in the distance calculation means is shorter than a predetermined distance, the plurality of reflected waves are produced by transmission waves emitted close to each other from the radar means, and a difference between the intensities of the plurality of reflected waves calculated by the intensity calculation means is lower than a predetermined value.

A vehicle forming an object of recognition in this object recognition apparatus has reflectors mounted symmetrically in right and left directions on its rear surface, and the reflectors have a reflection intensity higher than that of a body of the vehicle. Therefore, the reflected waves from the reflectors do not become unstable unlike the reflected waves from the vehicle body portions, and the stable reception by the radar means becomes feasible.

For stable detection of a vehicle forming an object of recognition, the present invention utilizes the intensities of reflected waves. That is, in addition to a condition that the reflecting objects stand close to each other, a condition that the difference between the intensities of the reflected waves falls below a predetermined value is employed as the reflecting object unification conditions for the reflecting objects recognized in the form of points.

Thus, if the reflecting objects are recognized as a unitary reflecting object when the difference between the intensities of the reflected waves is below a predetermined value, a portion (for example, a vehicle body portion) having a low reflection intensity and a portion (for example, a reflector portion) having a high reflection intensity is distinguishable. As a result, of the unitary reflecting objects, the calculation of a distance to the reflecting object or the calculation of a shape thereof is made with reference to the reflecting object having a high intensity of the reflected wave, which enables the correct detection of the distance to the object, the shape thereof and the like.

In this configuration, preferably, the intensity calculation means classifies the reflected waves into a plurality of groups according to intensity of the reflected wave, and when a plurality of reflected waves are classified as the same group by the intensity calculation means, the first unification means makes a decision that the intensity difference therebetween falls below a predetermined value. This enables easy discrimination between the intensities of the reflected wave and the difference therebetween.

Moreover, in the aforesaid configuration, preferably, when the distance calculated in the distance calculation means falls below a predetermined distance, the recognition means excludes a reflecting object, which is not unified with another reflecting object, from an object of recognition. The intensity of the reflected wave from an object existing in a range below the predetermined distance tends to increase. Therefore, when an object exists actually, a plurality of reflected waves having intensities approximate to each other are to be received by the radar means. From a different point of view, in a case in which a reflecting object causing one reflected wave is not unified with another reflecting object, it can be considered that the reflected wave is a noise appearing for some factor. Accordingly, in such a case, it is preferable that the reflecting object stemming from the reflected wave is excluded from object of recognition.

Still moreover, in the aforesaid configuration, preferably, when the intensity of the reflected wave calculated in the intensity calculation means falls below a predetermined level and the number of reflected objects to be unified falls below a predetermined number (value), the recognition means excludes the reflecting object from the object of recognition. This is because, even in a case in which the intensity of the reflected wave is low and the number of reflecting objects to be united is below a predetermined number (including zero), it can be considered that the reflecting objects are noises occurring for some reason.

Yet moreover, in the aforesaid configuration, preferably, the first unification means prolongs the predetermined distance, which forms the condition on the difference between the distances calculated on the basis of a plurality of reflected waves in the distance calculation means, as the distance calculated in the distance calculation means becomes longer. This is because the intensity of the reflected wave tends to lower as the distance to the reflecting object lengthens and the correlation exists between a drop of the intensity of the reflected wave and an accuracy of distance measurement. That is, since the distance measurement accuracy tends to lower as the distance to the reflecting object lengthens, it is preferable to relax the distance condition for the unification decision.

In addition, in the aforesaid configuration, preferably, when the number of transmission waves intervening between two transmission waves falls below a predetermined number, the first unification means makes a decision that the transmission waves are emitted close to each other, and decreases the number of transmission waves as the distance calculated in the distance calculation means prolongs. Since a plurality of transmission waves are emitted throughout a predetermined angular range from the radar means, if an object exists at a short distance from the one's vehicle, more transmission waves are reflected from the object and the interval between the transmission waves at the arrival at the object is short. Add to it that the interval between the transmission waves becomes longer as the distance between the object and the one's vehicle becomes longer. Therefore, if, as mentioned above, the decision indicative of the transmission waves emitted close to each other is made when the number of transmission waves intervening between two transmission waves falls below a predetermined number, it is preferable that the number of transmission waves is decreased as the distance to the object becomes longer.

Still additionally, in the aforesaid object recognition apparatus, the radar means is made to emit a plurality of transmission waves along a lateral direction of the vehicle, and the recognition means includes second unification means for, when there are a plurality of reflecting objects each undergoing the unification in the first unification means and each of a distance between the plurality of reflecting objects in a lateral direction of the vehicle and a distance therebetween in an emission direction of the transmission waves is shorter than a predetermined unification decision distance, unifying the plurality of reflecting objects to recognize them as a unitary reflecting object.

Thus, reflecting objects each comprising reflecting objects having the reflected wave intensities approximate to each other are obtained and, when they are considered to be the same object from the positional relationship between the reflecting objects, they are recognized as a unitary reflecting object. Accordingly, since the reflected wave intensities have been obtained with respect to the reflecting objects constituting the unitary reflecting object, for example, the distance to the unitary reflecting object can be calculated only the reflecting objects having reflected wave intensities exceeding a predetermined level, and if the size of the unitary reflecting object is out of a normal range, the reflecting objects having a low reflected wave intensity can be excluded before obtaining the size of the unitary reflecting object. This enables more precise recognition on an object such as a preceding vehicle.

Preferably, the second unification means sets the unification decision distance so that it is prolonged as the distance to the reflecting object in the emission direction of the transmission wave becomes longer.

Yet additionally, in the aforesaid object recognition apparatus, preferably, the recognition means includes distance/shape calculation means for obtaining a distance to the unitary reflecting object undergoing the unification in the second unification means and a width of this unitary reflecting object, and the distance/shape calculation means obtains the distance to the unitary reflecting object undergoing the unification in the second unification means on the basis of a distance to the unitary reflecting object obtained by unifying the reflecting objects having a reflected wave intensity exceeding a predetermined level in the first unification means. The reflected waves having an intensity above a predetermined level are stably receivable by the radar means, and the distance to the unitary reflecting object obtained by unifying the reflecting objects whose reflected wave intensities exceeds a predetermined level becomes extremely high in measurement accuracy. Therefore, when the distance to the unitary reflecting object is obtained on the basis of the distance to the unitary reflecting object obtained by unifying the reflecting objects whose reflected wave intensities exceed the predetermined level, the distance accuracy is improvable.

Preferably, in a case in which the second unification means obtains a unitary reflecting object comprising a plurality of reflecting objects, when the reflected wave intensities of the plurality of reflecting objects are different from each other and the width of the unitary reflecting object exceeds a predetermined length, the distance/shape calculation means excludes the reflecting object having the lowest reflected wave intensity and obtains the width of the unitary reflecting object. The object of recognition in the object recognition apparatus is a vehicle and, naturally, the possibility that an object having a width exceeding a width of a vehicle exists in a vehicle existence zone is extremely low. Therefore, in this case, it is presumable that the reflecting objects whose reflected wave intensities are relatively low originate from noise and the like.

Moreover, in the aforesaid object recognition apparatus, the radar means is made to emit transmission waves plural times throughout a predetermined angular range in the horizontal (lateral) direction of the vehicle while changing the emission angle in the vertical direction of the vehicle, and each of the first and second unification means performs the unification of the reflecting objects to obtain unitary reflecting objects for each transmission wave emission line in the horizontal direction of the vehicle, and each of the first and second unification means performs the unification of the reflecting objects to obtain unitary reflecting objects for each transmission wave emission line in the horizontal direction of said vehicle, and the recognition means further includes targeting means for, when the unitary reflecting objects obtained for each emission line exist at positions closet to each other and a difference between moving speeds thereof is below a predetermined speed difference, further unifying the unitary reflecting objects to recognize the further unified unitary reflecting object as a target.

As mentioned above, when a plurality of transmission wave emission lines are set in the vertical direction of the vehicle, there is a need to make a decision as to whether or not the unitary reflecting objects obtained through the emission lines adjacent to each other constitute the same object. In this case, like the conventional technique, if a decision on the same object is merely made on the basis of only the positional relationship among the unitary reflecting objects, difficulty can be experienced in recognizing an object such as preceding vehicle with accuracy. That is, as mentioned above, in a case in which a stationary thing such as a signboard is at a position above a preceding vehicle or at a side thereof, the preceding vehicle can be recognized as being integrated with the stationary object.

For this reason, only when the difference in moving speed between the unitary reflecting objects each obtained through each emission line falls below a predetermined speed difference, these unitary reflecting objects are regarded as the same object and recognized as a unitary target. This can avoid the aforesaid problem, i.e., the situation in which a moving object and a stationary object are recognized as the same object in error.

Still moreover, in this object recognition apparatus, preferably, the moving speed of the unitary reflecting object is calculated as a relative speed in the horizontal direction and a relative speed in the transmission wave emission direction with respect to one's vehicle, and when both the relative speeds of each of a plurality of unitary reflecting objects falls below a predetermined speed difference, the targeting means sets the plurality of unitary reflecting objects as a unitary target. Thus, the employment of both the relative speeds in the horizontal direction of the vehicle and in the transmission wave emission direction enables the moving state of a moving object existing in front of the one's vehicle to be captured correctly. Therefore, not only with respect to a moving object and a stationary object, but also with respect to a moving object and a moving object, it is possible to prevent them from being recognized as the same object in error.

Yet moreover, in this object recognition apparatus, on the basis of a distance to a unitary reflecting object calculated by the distance/shape calculation means, a width of the unitary reflecting object and a relative speed of the unitary reflecting object, the targeting means calculates an estimated area, in which the unitary reflecting object exists, at each detection time interval of the radar means, and when another unitary reflecting object pertains to the interior of the estimated area, the targeting means makes a decision that these unitary reflecting objects exist at positions close to each other.

Furthermore, in accordance with a further aspect of the present invention, there is provided a distance measurement apparatus comprising outputting means for emitting a transmission wave to around a vehicle to output a reception signal (receive signal) corresponding to an intensity of a reflected wave therefrom, decision means for making a decision as to whether or not an amplitude and a wavelength of the reception signal satisfy a predetermined relationship, and detection means for detecting a distance to a reflecting object on the basis of the reception signal satisfying the predetermined relationship as a decision result in the decision means.

Thus, the distance measurement apparatus according to the present invention makes a decision as to whether or not the amplitude and wavelength of the detected reflected wave satisfy the predetermined relationship and implements the distance measurement when they satisfy the predetermined relationship. That is, for example, in a case in which an optical wave is used as the transmission wave and an outputting means is employed which outputs a reception signal corresponding to an intensity of a reflected wave of the optical wave, the following relationship comes into existence. That is, if a strong light is detected, the amplitude and wavelength of the reception signal show a large value and, on the other hand, if a weak light is detected, the amplitude and wavelength of the reception signal show a small value.

Accordingly, by extracting the reception signal satisfying a predetermined relationship in amplitude and wavelength, it is possible to make an accurate decision as to whether or not the reception signal is to be used for the distance measurement.

In this configuration, the decision means includes first amplitude decision means for making a decision as to whether or not the amplitude of the reception signal exceeds a predetermined first predetermined value, second amplitude decision means for making a decision as to whether or not the amplitude of the reception signal exceeds a second predetermined value smaller than the first predetermined value, and time width decision means for making a decision on the relationship in magnitude between a time width for which the amplitude of the reception signal exceeds the second predetermined value and a preset reference time width, with a decision being made as to whether or not the magnitude of the amplitude of the reception signal decided by the first and second amplitude decision means and the time width decided by the time width decision means satisfy a predetermined relationship.

Since each of the amplitude and wavelength of the reception signal has a correlation with the intensity of a reflected wave as mentioned above, by making a decision as to whether or not the amplitude of the reception signal exceeds the first or second predetermined value and by making a decision on the time length (time length) for which it exceeds the second predetermined value, a decision can be made as to whether or not the amplitude and wavelength of the reception signal satisfy a predetermined relationship.

In addition, in this distance measurement apparatus, the reference time width is set at a time width for which the amplitude of the reception signal exceeds the second predetermined value in a case in which the amplitude of the reception signal exceeds the first predetermined value and the reception signal is in a normal condition.

For example, the first predetermined value is set on the basis of the magnitude of the amplitude of a reception signal to be normally detected when a transmission wave is reflected by a reflector mounted on a rear portion of a vehicle, and the time width which appears in a case in which the amplitude of the reception signal exceeds the first predetermined value and for which the amplitude of the reception signal exceeds the second predetermined value is set as the reference time width. Therefore, for example, if the reception signal has an amplitude which does not reach the first predetermined value but having a time width exceeding the reference time width, it can removed as an abnormal signal to prevent the distance to the reflecting object from being detected on the basis of the abnormal reception signal.

Still additionally, in this distance measurement apparatus, the decision means makes a decision indicative of no satisfaction of the predetermined relationship when the first amplitude decision means makes a decision that the amplitude of the reception signal does not exceed the first predetermined value and the second amplitude decision means makes a decision that the amplitude of the reception signal exceeds the second predetermined value and the time width decision means makes a decision that the time width exceeds the reference time width.

Accordingly, this prevents the distance to the reflecting object from being detected on the basis of the reflected wave reception signal having a long time width apparently due to the environmental influence such as spray of water or black smoke.

Yet additionally, in this distance measurement apparatus, in a case in which the first amplitude decision means makes a decision that the amplitude of the reception signal exceeds the first predetermined value and the time width decision means makes a decision that the time width does not reach the reference time width, the decision means replaces the time width with the reference time width and makes a decision indicative of the satisfaction of the predetermined relationship.

For example, in a case in which two reflected waves (first reflected wave and a second reflected wave) are detected in conjunction with one transmission wave emitted, if the amplitude of the reception signal of the first reflected wave first detected exceeds the second predetermined value but not reaching the first predetermined value and the amplitude of the reception signal of the second reflected wave then detected exceeds the first predetermined value, it is considered that the time width for which it exceeds the second predetermined value is obtained through the use of the reception signal of the first reflected wave and a decision that it exceeds the first predetermined value is made through the use of the reception signal of the second reflected wave. In this case, because of making a decision on the time width for which it exceeds the second predetermined value through the use of the first reflected wave, the time width decision means makes a decision that the time width does not reach the reference time width. Therefore, irrespective of exceeding the first predetermined value, a decision is made that the reception signal is an abnormal signal having a short time width for which it exceeds the second predetermined value.

However, in this case, the second reflected wave has a high reception intensity, and it is presumable that the second reflected wave originates from the normal reflection from a reflector at a rear portion of a vehicle, or the like. Therefore, in a manner such that the time width of the first reflected wave for which it exceeds the second predetermined value is replaced with the reference time width, the decision means makes a decision that the magnitude of the amplitude of the voltage signal and the time width for which it exceeds the second predetermined value satisfy the predetermined relationship. In consequence, the distance to the reflecting object can be detected on the basis of the reception signal from the second reflected wave.

Moreover, in this distance measurement apparatus, the detection means includes a first intermediate time correction means for, when a decision result in the first amplitude decision means shows that the amplitude of the reception signal exceeds the first predetermined value, correcting an intermediate time of the time width for which the amplitude of the reception signal exceeds the first predetermined value so that the intermediate time agrees with a time at which the amplitude of the reception signal reaches a maximum value, and a second intermediate time correction means for, when a decision result in the second amplitude decision means shows that the amplitude of the reception signal exceeds the second predetermined value and a decision result in the first amplitude decision means shows that the amplitude of the reception signal does not exceed the first predetermined value, correcting an intermediate time of the time width for which the amplitude of the reception signal exceeds the second predetermined value so that the intermediate time agrees with a time at which the amplitude of the reception signal reaches a maximum value, with the distance to the reflecting object being detected by obtaining the time difference between the time of the emission of the transmission wave and the corrected intermediate time.

For example, in the case of the distance measurement apparatus using an optical wave, a correlation exists between the optical intensity of the reflected wave and the time width for which the amplitude of the reception signal as mentioned above, and the time at which the amplitude of the reception signal intersects with the second predetermined value in the fall (trailing) process of the reflected wave tends to more delay as the optical intensity of the reflected wave increases. That is, as the time width for which the amplitude of the reception signal exceeds the second predetermined value prolongs, the time at which the amplitude of the reception signal intersects with the second predetermined value in the fall process of the reflected wave tends to more delay, so the intermediate time of the time width does not coincide with the time at which the reception signal arrives at a peak.

When the distance to a reflecting object is obtained by multiplying the time difference between the time of the emission of a transmission wave and the time at which the reception signal of the reflected wave reaches a peak by the speed of light, if the central time of the time width does not coincide with the time at which the reception signal reaches a peak, the distance corresponding to that delay time is included in the form of an error.

For this reason, for the detection of the distance to a reflecting object, the distance corresponding to the delay time is corrected on the basis of the time width for which the amplitude of the reception signal exceeds the second predetermined value so that the intermediate time of this time width agrees with the time at which the reception signal reaches the peak. This enables detecting an accurate distance to the reflecting object on the basis of the corrected intermediate time.

Still moreover, in this configuration, correction quantity changing means is further provided to, when the distance to the reflecting object detected by the detection means is below a predetermined distance, change the correction quantities in the first intermediate time correction means and the second intermediate time correction means.

As mentioned above, for example, in the case of the distance measurement apparatus using an optical wave, the time at which the amplitude of the reception signal intersects with the second predetermined value in the fall processing of the reflected wave tends to more delay as the time width for which the amplitude of the reception exceeds the second predetermined value becomes longer. However, in a case in which a reflected wave from a reflecting object existing at a distance shorter than the predetermined distance is detected and the time width for which the amplitude of the reception signal exceeds the second predetermined value is short, the time difference between the aforesaid intermediate time of the time width and the voltage signal peak time becomes smaller than that in the case of a distance exceeding the predetermined distance. On the other hand, in a case in which the time width for which the amplitude of the reception signal exceeds the second predetermined value is long, the time difference between the aforesaid intermediate time of the time width and the time at which the voltage signal reaches a peak tends to become larger than that in the case of a distance exceeding the predetermined distance.

Accordingly, in a case in which a reflected wave from a reflecting object existing at a distance shorter than the predetermined distance is detected, the correction quantities in the first intermediate time correction means and the second intermediate time correction means are change in accordance with the wavelength (time width for which it exceeds the second predetermined value). This enables making an accurate detection of the distance to a reflecting object existing at a short distance.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Embodiments of the present invention will be described hereinbelow with reference to the drawings.

(First Embodiment)

According to a first embodiment of the present invention, an inter-vehicle control apparatus is equipped with an object recognition apparatus for a vehicle, and the inter-vehicle control apparatus has a function to issue an alarm when an obstacle lies in an alarm zone.

Figure 1:
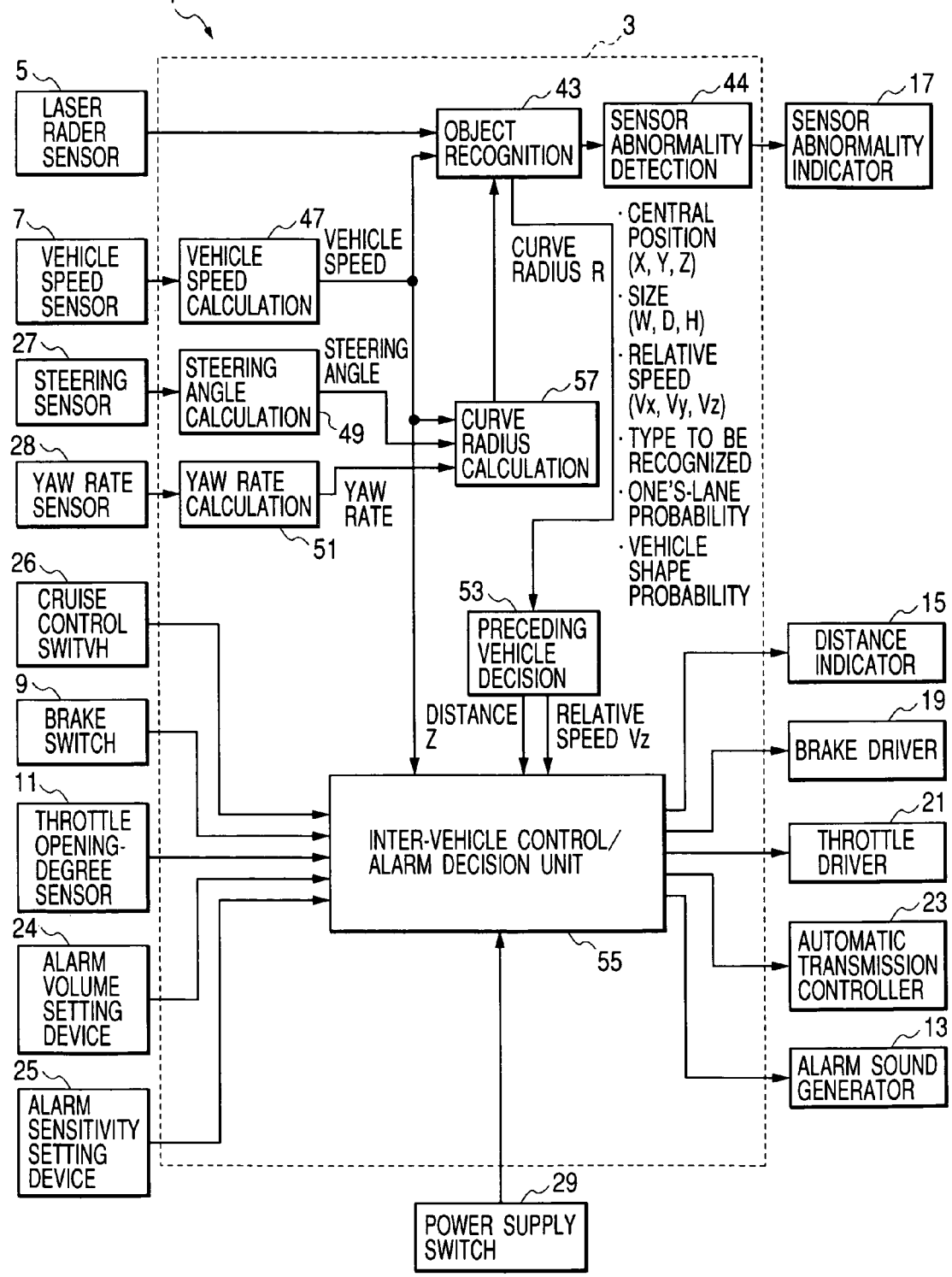
FIG. 1 is a block diagram showing a configuration of an inter-vehicle control apparatus involving an object recognition apparatus for a vehicle according to a first embodiment of the present invention.

FIG. 1 is a system block diagram showing the inter-vehicle control apparatus. In the illustration, the inter-vehicle control apparatus, generally designated at reference numeral 1, comprises a recognition/inter-vehicle control ECU 3 as a principal unit. The recognition/inter-vehicle control ECU 3 is composed of a microcomputer acting as a principal component, and is equipped with input/output interfaces (I/O) and various types of drive circuits and various types of detection circuits. This hardware configuration is of a general type, and the description thereof will be omitted for brevity.

The recognition/inter-vehicle control ECU 3 receives various detection signals from a laser radar sensor 5, a vehicle speed sensor 7, a brake switch 9 and a throttle opening-degree sensor 11, while outputting drive signals to an alarm sound generator 13, a distance indicator 15, a sensor abnormality indicator 17, a brake driver 19, a throttle driver 21 and an automatic transmission controller 23. Moreover, to the recognition/inter-vehicle control ECU 3, there are connected an alarm sound volume setting device 24 for setting an alarm sound volume, an alarm sensitivity setting device 25 for setting the sensitivity in alarm decision processing, a cruise control switch 26, a steering sensor 27 for detecting an operating degree of a steering wheel (not shown), and a yaw rate sensor 28 for detecting a yaw rate occurring in the vehicle. Still moreover, the recognition/inter-vehicle control ECU 3 is equipped with a power supply switch 29 and starts predetermined processing in response to the turning-on of the power supply switch 29.

Figure 2A:
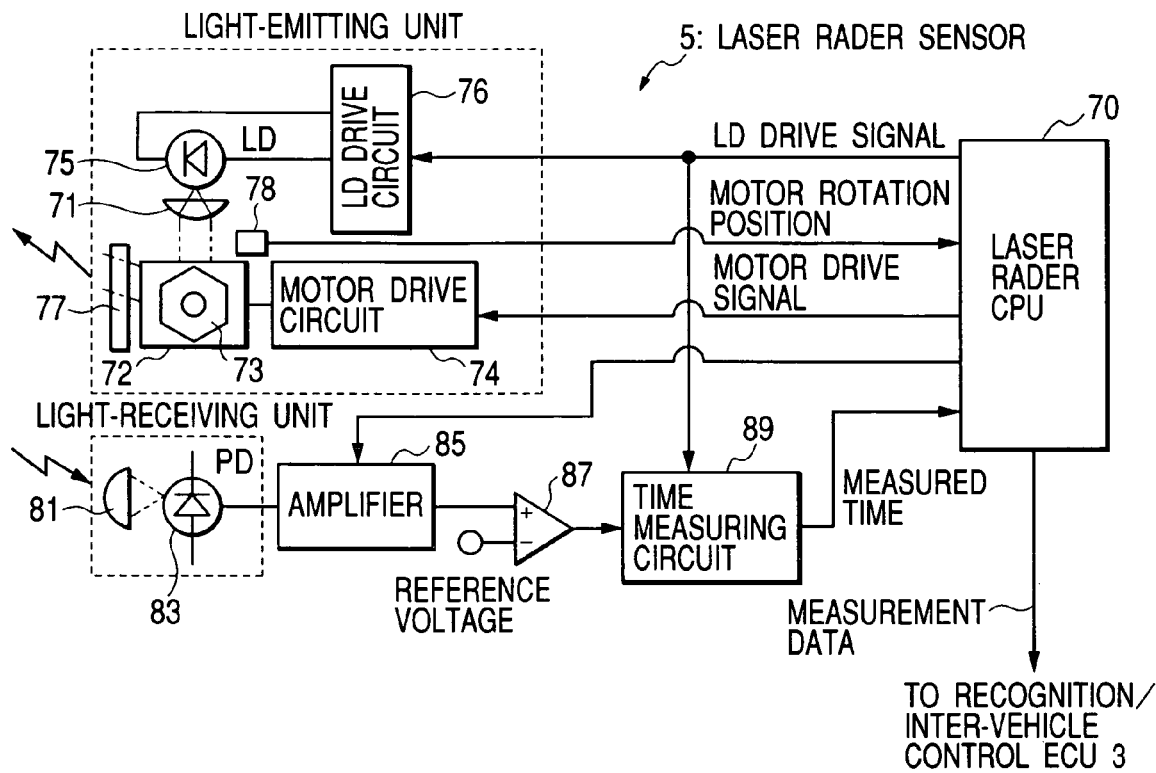
FIG. 2A is an illustration of a configuration of a laser radar sensor according to the first embodiment.

As FIG. 2A shows, the laser radar sensor 5 includes, as principal components, a light-emitting unit, a light-receiving unit, a laser radar CPU 70, and other components. The light-emitting unit includes a semiconductor laser diode (which will hereinafter be referred to simply as a "laser diode") 75 for emitting a pulse-like laser beam (laser light) through a light-emitting lens 71, a scanner 72 and a glass plate 77. The laser diode 75 is connected through a laser diode drive circuit 76 to the laser radar CPU 70 to emit a laser beam (light generation) in accordance with a drive signal from the laser radar CPU 70. Moreover, in the scanner 72, a polygon mirror 73 is provided to be rotatable around its vertical axis, and when a drive signal from the laser radar CPU 70 is inputted thereto through a motor drive unit 74, the polygon mirror 73 is rotated by a driving force from a motor (not shown). The rotational position of this motor is detected by a motor rotational position sensor 78 and is outputted to the laser radar CPU 70.

Figure 3:
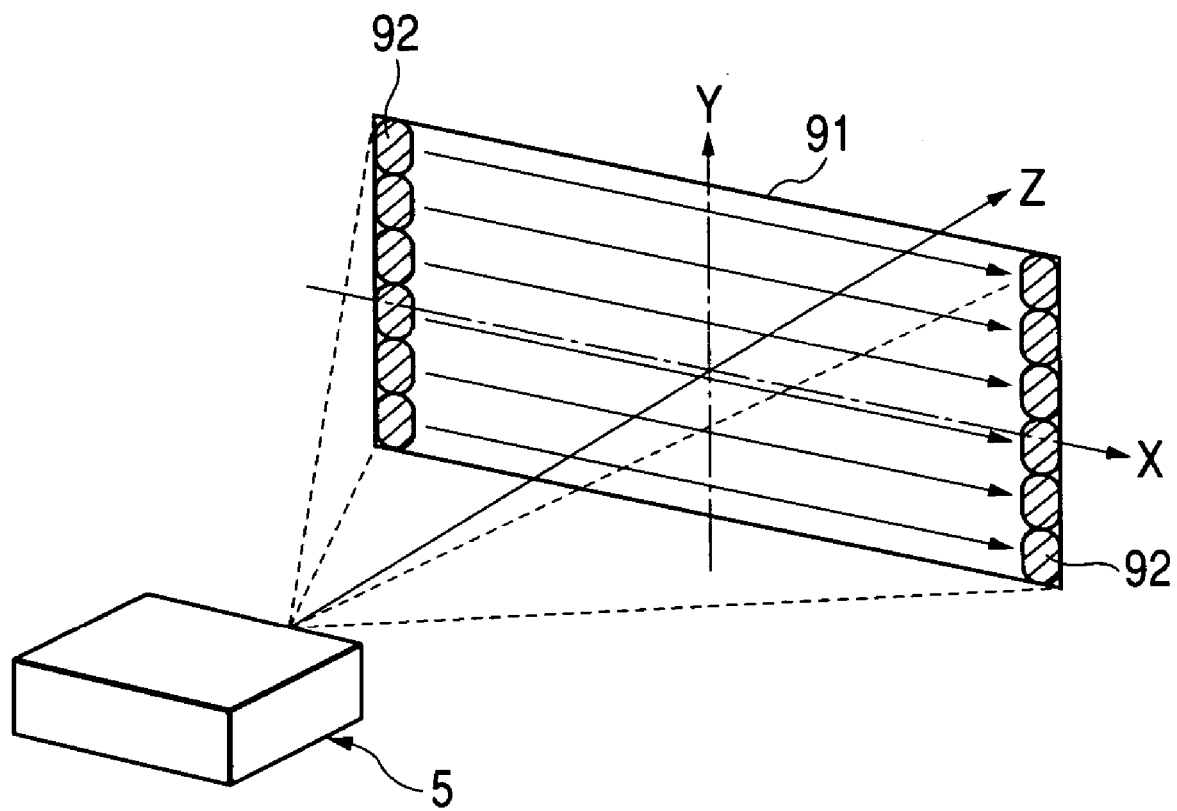
FIG. 3 is a perspective view showing an emission-possible area of the laser radar sensor.

In this embodiment, the polygon mirror 73 has six mirrors different in surface inclination angle from each other, thereby incontinuously outputting laser beams in a (sweep emission) scanning fashion within a predetermined angular range in each of the vertical and horizontal directions of the vehicle. Thus, the scanning is conducted two-dimensionally with the laser beams, and referring to FIG. 3, a description will be given of the scanning pattern. FIG. 3 shows laser beam patterns 92 made when a laser beam is emitted to only right and left end portions of a measurement area 91, and the laser beam patterns at intermediate positions are omitted from the illustration. Moreover, although in FIG. 3 the laser beam patterns 92 have a generally circular configuration, the present invention is not limited to this configuration but, for example, an elliptical configuration, a rectangular configuration or the like is also acceptable. Still moreover, instead of the laser beam, an electric wave such as a millimetric wave, an ultrasonic wave, or the like are also acceptable. Yet moreover, the present invention is not limited to the scanning, but a method capable of measuring two bearings, other than distances, is also acceptable.

As FIG. 3 shows, when the Z axis is taken as the center direction of the measurement area, the laser radar sensor 5 sequentially scans a predetermined area in a X-Y plane perpendicular to the Z axis. In this embodiment, the Y-axis direction which is a vertical direction is taken as a reference direction and the X-axis direction which is a horizontal (lateral) direction is taken as a scanning direction. The scanning area is such that 0.15 degree×105 points=16 degree (or 0.08 degree×450 points=20 degree) in the X-axis direction and 0.7 degree×6 lines=4 degree (or 1.4 degree×3 lines=4 degree) in the Y-axis direction. Moreover, the scanning direction is from the left side to the right side in FIG. 3 in the case of the X-axis direction and is from the upper side to the lower side in FIG. 3 in the case of the Y-axis direction. Concretely, with respect to the first scanning line at the uppermost position when viewed in the Y-axis direction, the scanning is conducted at an interval of 0.15° (or 0.08°; 450 laser beams) in the X-axis direction. This accomplishes the detection corresponding to one scanning line. Subsequently, likewise, with respect to the second scanning line at the next position when viewed in the Y-axis direction, the scanning is conducted at an interval of 0.15° (or 0.08°; 450 laser beams) in the X-axis direction. The scanning is repeated up to the sixth (third) scanning line in this way. Accordingly, the scanning is successively conducted from the upper left side to the lower right side, thereby providing data corresponding to 105 points×6 lines=630 points (or 450 points×3 lines=1350 points).

Through this two-dimensional scanning, scan angles θx, θy indicative of scanning directions and a measured distance r are obtainable. With respect to the two scan angles θx, θy, the angle made between a line obtained by projecting the laser beam emitted onto a Y-Z plane and the Z axis is defined as a vertical scan angle θy, and the angle made between a line obtained by projecting the laser beam onto a X-Z plane and the Z axis is defined as a horizontal scan angle θx.

Moreover, through this two-dimensional scanning, for each scanning line, the scan angle θx indicative of a scanning direction and a time difference from the emission of the laser beam to the reception of the reflected light thereof, corresponding to a distance to the reflecting target, are obtainable.

The light-receiving unit of the laser radar sensor 5 includes a light-receiving element 83 for receiving, through a light-receiving lens 81, the laser light reflected from an object (not shown) and outputting a voltage corresponding to an intensity thereof. The output voltage of this light-receiving element 83 is amplified by an amplifier 85 and then fed to a comparator 87. The comparator 87 compares the output voltage of the amplifier 85 with a reference voltage to output a predetermined light-reception signal to a time measurement circuit 89 when the output voltage>the reference voltage.

Figure 2B:
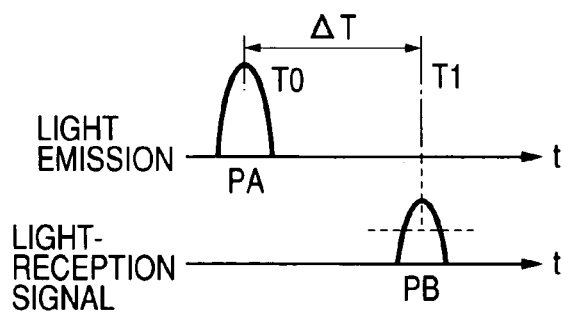
FIG. 2B is an illustration useful for explaining a distance detecting method in the laser radar sensor.

To the time measurement circuit 89, there is also inputted a drive signal outputted from the laser radar CPU 70 to the laser diode drive circuit 76. As shown in FIG. 2B, the aforesaid drive signal is taken as a start pulse PA and the aforesaid light-reception signal is taken as a stop pulse PB, and the phase difference between the two pulses PA and PB (that is, the difference ΔT between the time T0 at which a laser beam is emitted and the time T1 at which the reflected light is received) is encoded into a binary digital signal. Still moreover, the time for which the stop pulse PB exceeds a reference voltage is measured as the pulse width of the stop pulse PB. After encoded into binary digital signals, these values are outputted to the laser radar CPU 70. The laser radar CPU 70 calculates a distance r up to an object as a function of the time difference ΔT between the two pulses PA and PB inputted from the time measurement circuit 89 to produce positional data on the basis of the distance r and the corresponding scan angles θx, θy. That is, with the center of the laser radar being set as the origin (0, 0, 0), the conversion into X-Y-Z orthogonal coordinates is made in a state where the horizontal (lateral) direction of the vehicle is taken as the X axis, the vertical (height) direction thereof is taken as the Y axis and the forward direction thereof is taken as the Z axis. Moreover, the data (X, Y, Z) on this X-Y-Z orthogonal coordinates conversion and the light-reception intensity data (corresponding to the pulse width of the stop pulse PB) are outputted as measurement (range) data to the recognition/inter-vehicle control ECU 3.

Moreover, the laser radar CPU 70 outputs the time difference ΔT between the two pulses PA and PB inputted from the time measurement circuit 89, the laser beam scan angle θx and the light-reception intensity data (corresponding to the pulse width of the stop pulse PB) as the measurement data to the recognition/inter-vehicle control ECU 3.

Figure 2C:
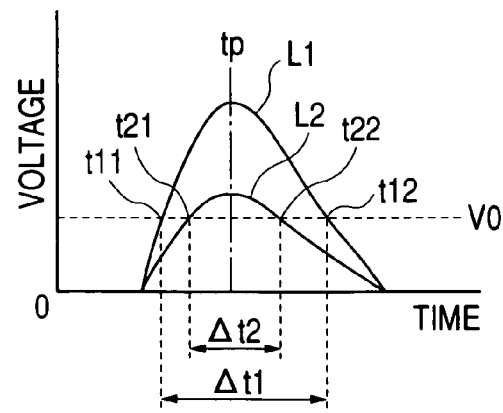
FIG. 2C is an illustration useful for explaining a pulse width of a stop pulse serving an index indicative of a light-reception intensity.

Referring to FIG. 2C, a description will be given hereinbelow of the light-reception data. FIG. 2C shows stop pulses of two reflected light different in light-reception intensity from each other. In FIG. 2C, a curve L1 corresponds to the stop pulse PB of the reflected light having a relatively high light-reception intensity, while a curve L2 corresponds to the stop pulse PB of the reflected light having a relatively low light-reception intensity.

In this illustration, the time at which the curve L1 intersects a reference voltage V0 to be inputted to the comparator 87 during the leading (rise) of the curve L1 is taken as t11 and the time at which the curve L1 intersects the reference voltage V0 during the falling (trailing) of the curve L1 is taken as t12, with the difference between the time t11 and the time t12 being taken as Δt1. Moreover, the time at which the curve L2 intersects a reference voltage V0 during the leading of the curve L2 is taken as t21 and the time at which the curve L2 intersects the reference voltage V0 during the falling of the curve L2 is taken as t22, with the difference between the time t21 and the time t22 being taken as Δt2. The reference voltage V0 is set at a value whereby the influence of noise components is avoidable.

As obvious from FIG. 2C, making a comparison between the time difference Δt1 forming the pulse width of the stop pulse PB of the reflected light having a high light-reception intensity and the time difference Δt2 forming the pulse width of the stop pulse PB of the reflected light having a low light-reception intensity, there arises the relationship of Δt1>Δt2. That is, the pulse width of the stop pulse PB of the reflected light has the association with the light-reception intensity, and when the pulse width becomes short when the light-reception intensity is low, while the pulse width becomes long when the light-reception intensity is high. Accordingly, the time difference (Δt1, Δt2) forming the pulse width serves as an index about the intensity of the received reflected light.

In this connection, the light-reception intensity varies the reflection intensity of the reflecting object and the distance to the reflecting object. That is, in a case in which the reflection intensity of the reflecting object is high or if the distance to the reflecting object is short, the light-reception intensity of the reflected light therefrom increases and, if the reflection intensity thereof is low or if the distance to the reflecting object is long, the light-reception intensity of the reflected light therefrom decreases.

The recognition/inter-vehicle control ECU 3 recognizes an object on the basis of the measurement data from the laser radar sensor 5 and outputs drive signals to the brake driver 19, the throttle driver 21 and the automatic transmission controller 23 according to the situation of a preceding vehicle obtained from the recognized object, thereby implementing the so-called inter-vehicle control to control the vehicle speed. Moreover, the alarm decision processing is simultaneously conducted which is for issuing an alarm, for example, when the recognized object resides in a predetermined alarm zone for a predetermined period of time. In this case, for example, the object is a preceding vehicle running in front of this vehicle or a vehicle stopping in front of that vehicle.

Furthermore, referring to FIG. 1, a description will be given hereinbelow of an internal configuration (control blocks) of the recognition/inter-vehicle control ECU 3. The measurement data outputted from the laser radar sensor 5 is fed to an object recognition block 43. The object recognition block 43 obtains the central position (X, Y, Z) and the size (W, D, H), including a width W, a depth D, and a height (H), of the object on the basis of the three-dimensional positional data obtained as the measurement data. Moreover, the relative speed (Vx, Vy, Vz) of that object with respect to this vehicle is obtained on the basis of the time variation of the central position (X, Y, Z). Still moreover, the object recognition block 43 makes a discrimination as to whether the object is a stopping object or a moving object, on the basis of a vehicle speed (the speed of one's vehicle), calculated on the basis of a detection value of the vehicle speed sensor 7 and outputted from a vehicle speed calculation block 47, and the aforesaid obtained relative speed (Vx, Vy, Vz). An object, which can exert influence on the traveling of one's vehicle, is selected on the basis of the discrimination result and the central position of the object and the distance up to this vehicle is displayed on the distance indicator 15.

Furthermore, in the object recognition block 43, with the center of the laser radar sensor 5 being taken as the origin (0, 0), for each scanning line, the time difference ΔT and the scan angle θx obtained as the measurement data are converted into X-Z orthogonal coordinates in which the lateral (horizontal direction) of the vehicle is taken as the X axis and the forward direction of the vehicle is taken as the Z axis. The measurement data converted into the X-Z orthogonal coordinates are subjected to three kinds of unification processing: presegmentation data processing, definitive-segmentation data processing and targeting processing, which will be described later, and are collected for each object existing in front of the vehicle.

The central position (X, Z) and size (W, D) of an object are obtained on the basis of the measurement data collected for each object. Moreover, a relative speed (Vx, Vy) of the object such as a preceding vehicle with respect to the position of the one's vehicle is obtained on the basis of a time variation of the central position X, Z) of the object. Still moreover, on the basis of the vehicle speed (one's vehicle speed) outputted from the vehicle speed calculation block 47 on the basis of a detection value from the vehicle speed sensor 7 and the obtained relative speed (Vx, Vz), the object recognition block 43 makes a decision as to whether the object is a stopping object or a moving object. In this connection, (X, D) indicative of the size of the object are (width, depth), respectively.

In addition, a steering angle calculation block 49 calculates a steering angle on the basis of a signal from the steering sensor 27, and a yaw rate calculation block 51 calculates a yaw rate on the basis of a signal from the yaw rate sensor 28. Moreover, a curve radius (radius of curvature) calculation block 57 calculates a curve radius (radius of curvature) R on the basis of the vehicle speed from the vehicle speed calculation block 47, the steering angle from the steering angle calculation block 49 and the yaw rate from the yaw rate calculation block 51. Still moreover, the object recognition block 43 calculates a vehicle shape probability or its own lane probability (one's-lane probability) on the basis of the curve radius R, the central position coordinates (X, Z) and the like. A description about these vehicle shape probability and lane probability will be given later. Yet additionally, in a preceding vehicle decision block 53, on the basis of the curve radius R and the central position coordinates (X, Z), the size (W, D) of the object and the relative speed (Vx, Vz) obtained in the object recognition block 43, a preceding vehicle closest in distance to the one's vehicle is selected to calculate the distance Z from the preceding vehicle and the relative speed thereto.

A model of the object having such data will be referred to as a "target model". A sensor abnormality detection block 44 detects whether or not the data obtained in the object recognition block 43 is a value falling within an abnormal range. If it is within the abnormal range, this fact is displayed on the sensor abnormality indicator 17.

On the other hand, a preceding vehicle decision block 53 selects a preceding vehicle on the basis of various data obtained from the object recognition block 43 and obtains a distance Z to the preceding vehicle in the Z-axis direction and a relative speed Vz thereto. Moreover, on the basis of the distance Z from the preceding vehicle, the relative speed Vz thereto, a setting state of the cruise control switch 26, a pressing state of the brake switch 9, an opening degree from the throttle opening degree sensor 11 and a sensitivity set value from the alarm sensitivity setting device 25, an inter-vehicle control/alarm decision unit 55, in the case of the alarm decision, makes a decision on whether or not to issue an alarm and, in the case of the cruise decision, determines the contents of the vehicle speed control. If the result shows that the alarm is necessary, an alarm issuing signal is outputted to the alarm sound generator 13. On the other hand, in the case of the cruise decision, control signals are outputted to the automatic transmission controller 23, the brake driver 19 and the throttle driver 21 to carry out the necessary control. Moreover, at the implementation of these control, a needed display signal is outputted to the distance indicator 15 to notify the situation to the vehicle driver.

Such inter-vehicle control or alarm decision are premised on the object recognition. In more detail, an important factor is to appropriately carry out the recognition of the vehicle forming an object of recognition. Therefore, a description will be given hereinbelow of the processing for the object recognition to be implemented in the object recognition block 43 of the recognition/inter-vehicle control ECU 3 for the appropriate vehicle recognition.

Figure 4A:
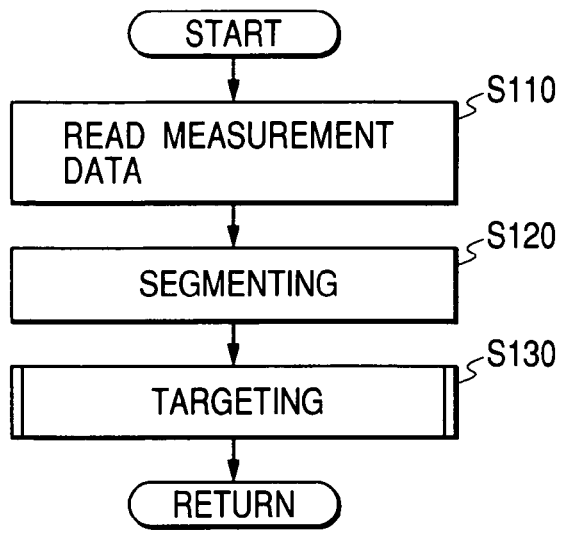
FIG. 4A is a flow chart showing processing for object recognition according to the first embodiment.

FIG. 4A is a flow chart showing main processing for the object recognition.

In FIG. 4A, a step S110 is implemented to read measurement data corresponding to one scan from the laser radar sensor 5. In the laser radar sensor 5, the scan cycle is, for example, 100 msec, and the data is read at an interval of 100 msec.

In a step S120, data are segmented. As mentioned above, the three-dimensional positional data acquired as the measurement data are grouped to form segments. For this segmenting, data satisfying a predetermined connection condition (unity condition) are collected to produce one presegment data, and of the presegment data, data satisfying a predetermined connection condition (unity condition) are collected to produce one definitive segment data. For example, the presegment data is obtained in a manner such that, with respect to data point-recognized, the point sets are unified when satisfying two conditions that the distance $\Delta X$ in the X-axis direction is below (shorter than) 0.2 m and the distance $\Delta Z$ in the Z-axis direction is below 2 m. In this embodiment, there are six scanning lines in the Y-axis direction and, through the presegmenting, the presegment data are produced for each line. Subsequently, for definitive-segmenting, the presegment data close to each other in a three-dimensional (X, Y, Z) space are unified (definitive-segmenting). Each of the definitive segment data forms a rectangular parallelepiped region having three edges in parallel along the X axis, the Y axis and the Z axis, and the center coordinates (X, Y, Z) thereof and the lengths (W, H, D) of the three edges representative of the size are used as the data contents. Incidentally, unless otherwise specified particularly, the definitive segment (data) will be referred to simply as "segment (data)".

Figure 4B:
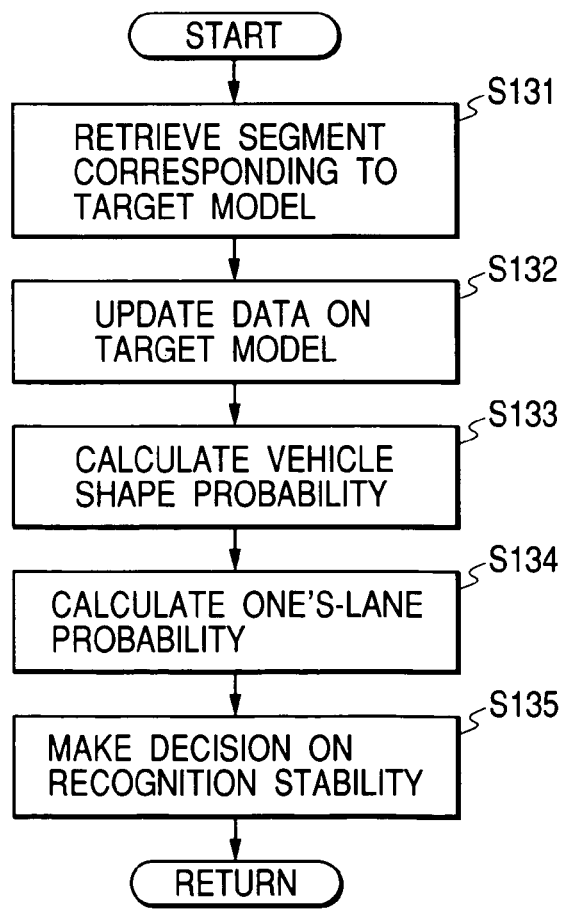
FIG. 4B is a flow chart showing targeting processing to be implemented in the flow chart of FIG. 4A.

In a step S130, targeting processing is conducted to target a vehicle or the like, forming each object of recognition. The "target" is a model of an object produced with respect to a group of segments. Referring to FIG. 4B, a description will be given hereinbelow of the targeting processing.

In this targeting processing, the corresponding segments of a target model are first retrieved (S131). This is processing to retrieve which of the segments detected this time the target model obtained previously agrees with, and the segment corresponding to the target model is defined as follows. First, assuming that the target model has moved from the position at the implementation of the last processing at the relative speed at the implementation of the last processing, an estimated position at which the target model exists at present is calculated. Following this, around the estimated position, an estimated moving range is set which has a predetermined width (quantity) in each of the X-axis, Y-axis and Z-axis directions, and the segment at least partially included in the estimated moving range is set as the corresponding segment.

In a step S132, the updating processing on the data on the target model is conducted. This processing, if there is the corresponding segment, updates the past data on the target model with the present data. The data to be updated are the central coordinates (X, Y, Z), the width W, the height H, the depth D, the relative speeds (Vx, Vy, Vz) in the X-axis, Y-axis and Z-axis directions, the four-times central coordinates (X, Y, Z) data taken in the past, the one's-lane probability, and the like. In this connection, if there is no corresponding segment, the data updating on the target model is not made, and a new target model is registered.

Thereafter, a vehicle shape probability is calculated in a step S133. The "vehicle shape probability" is an index indicative of a probability of a target model being a vehicle, and it is calculated on the basis of relative acceleration, shape, position, light-reception intensity and detection time. A detailed description will be given hereinbelow of this vehicle shape probability.

In a case in which a large number of delineators are installed at a short interval along a roadside or when a guard rail is detected, there is a possibility that these stationary objects are recognized as a moving matter in error. This is because, when something is always detected at the same position, a decision is made that a vehicle running at the same speed as that of this vehicle exists at that position. Therefore, the vehicle shape probability is calculated in order to prevent an object recognized as a moving object in error from being judged as a preceding vehicle in error. In the preceding vehicle decision block 53, if a decision indicative of a roadside matter is made when the vehicle shape probability is, for example, below 50%, it is possible to prevent a repeatedly appearing stationary matter from being judged as a preceding vehicle in error.

The range the vehicle shape probability can take is 0 to 100%, and after the calculation of a vehicle shape probability instantaneous value for each target model, for reducing the influence of instantaneous noise and dispersion, the weighted mean is made according to an equation (1).

$$\text{present vehicle shape probability} = \text{last value} \times \alpha + \text{present instantaneous value} \times (1-\alpha) \tag{1}$$

In this case, for example, the initial value is set at 50%, and $\alpha$ is set at, for example, 0.8.

For obtaining the instantaneous value of the vehicle shape probability, the certainty on a vehicle is calculated as an adjustment (add/subtract) value with respect to each the relative acceleration, the shape, the position, the light-reception intensity and the detection time and the calculated values are summed up.

With respect to the relative acceleration, for example, the add-subtract value is set according to the number of times of satisfaction of the equation $|\alpha j| > \alpha 0 + \alpha n / j^2$. For example, if this equation is satisfied with respect to two or more relative acceleration $\alpha j$, the adjustment value is set at −50%, and if it is satisfied with respect to one relative acceleration $\alpha j$, the add-subtract value is set at −10%. In this connection, in the case of non-satisfaction, the addition or subtraction is not carried out. In this equation, $\alpha j$ represents a calculated relative acceleration, $\alpha 0$ designates an allowable relative acceleration and $\alpha n$ depicts a value at a noise sampling cycle stemming from a measurement error. Japanese Patent Laid-open No. HEI 9-178848 discloses this equation (step 307 in FIG. 7), and the detailed description thereof will be omitted for brevity.

In addition, with respect to the shape of a vehicle, when the width W falls within a predetermined range (for example, $1.2 \text{ m} \leq W \leq 2.8 \text{ m}$) and the depth D is below a first predetermined length (for example, 3 m), the object is likely to be a vehicle and, hence, the adjustment value is set at +30%. Even in a case in which the width W is out of the aforesaid range (1.2 m>W, or W>2.8 m), if the depth D is shorter than a second predetermined length (for example, 5 m) longer than the first predetermined length, the object is a motorbike, a large-sized truck or the like and, hence, the adjustment value is set at +10%. Moreover, also in a case in which the width W falls within a predetermined range (for example, 1.2 m≦W≦2.8 m) and the depth D is between first and second predetermined lengths (for example, 3 m≦D<5 m), the object is a truck or the like and, hence, the add-subtract value is set at +10%.

On the other hand, in a case in which the depth D is long (for example, D>5) and the width-depth ratio (D/W) is large (for example, 8 or more), the object is an object long in a longitudinal direction, such as a guard rail, and, hence, the adjustment value is set at −50%.

Secondly, a description will be given hereinbelow of the setting of certainty on a vehicle on the basis of the position of a target model and the light-reception intensity of a reflected wave.

Since a rear surface of a vehicle is constructed with a metallic surface and is equipped with a reflector and, hence, has a higher reflection intensity than that of an object (grass, tree, splash, sand/dust, or the like). For this reason, a discrimination between a vehicle and a non-vehicle can be made on the basis of the light-reception intensity of a laser beam reflected from an object.

However, in a case in which mud or the like sticks to a rear surface of a vehicle, all the reflected light from the vehicle do not show a high light-reception intensity. Therefore, in this embodiment, in order to make a precise decision on the reflection intensity of each object, the highest light-reception intensity is extracted from the light-reception intensities of the measurement data corresponding to a target model of each object and the discrimination between a vehicle and a non-vehicle is made on the basis of this highest light-reception intensity.

Concretely, the highest light-reception intensity of the reflected light from objects existing in a range below a first distance (for example, 15 m) is compared with a first predetermined intensity. If the highest light-reception intensity of the reflected light is below the first predetermined intensity, since the highest light-reception intensity is low irrespective of a short distance, it is presumable that the object is an object (non-vehicle), such as grass or tree existing on roadsides, showing a low reflection intensity. Therefore, in this case, the adjustment value is set at −30%. At this time, if it can be confirmed that the position at which the object exists is in roadsides, it is possible to more accurately make a decision that the object is grass, tree or the like. Accordingly, it is also appropriate to add a condition that the position of the object is separated by a predetermined distance (for example, 1 m) in a lateral direction with respect to the traveling direction of the one's vehicle. Moreover, it is also appropriate to add a condition that the width W of the object is shorter than a predetermined width (for example, 0.1 m) smaller than the width of a vehicle. This is because, in a case in which the width W of the reflecting object is shorter than the width of a vehicle, in most cases the reflecting object is a non-vehicle, such as tree, grass planted in roadsides, or splash, sand/dust blown up over a road.

With respect to the width W, it is also appropriate that, for example, a plurality of widths are set (for example, 0.1 m and 0.5 m) and the minus value of the adjustment value is made smaller as the width increases. That is, when the width W is smaller than 0.1 m, since the possibility of it being an object other than a vehicle is extremely high, as mentioned above, the adjustment value is set at −30%, and in the case of 0.1≦W<0.5, for example, the adjustment value is set at −10%.

Moreover, the highest light-reception intensity of the reflected light from an object existing within a range of a second distance (for example, 3 m) shorter than the aforesaid first distance (15 m) is compared with a second predetermined intensity lower than the aforesaid first predetermined intensity. If the highest light-reception intensity of the reflected light is lower than the second predetermined intensity, it is presumable that the reflecting object is an object such as splash or sand/dust having an extremely low reflection intensity. Therefore, also in this case, the adjustment value is set at, for example, −10%. Likewise, since it is possible to enhance the accuracy of presumption on the splash or sand/dust by confirming the size of the reflecting object, it is also appropriate to add a condition that, for example, the width W is shorter than a predetermined width (for example, 0.5 m).

In this connection, in this embodiment, since the light-reception intensity of the reflected light is expressed by the pulse width of the stop pulse PB, the first and second predetermined intensities to be compared with the highest light-reception intensity of the reflected light are given by pulse width times.

In addition, it is also appropriate to change the above-mentioned first and second predetermined intensities in accordance with the distance to a reflecting object. That is, the first and second predetermined intensities can also be made lower as the distance to the reflecting object, actually detected, becomes longer. This is because, even if the reflecting object reflection intensity is the same, the reflection intensity lowers with the distance to the reflecting object.

Furthermore, with respect to the detection time, for example, the adjustment value is set at +20% when the detection time exceeds 2 seconds, and it is set at +50% when the detection time exceeds 5 seconds. In the case of traveling while following a preceding vehicle, the preceding vehicle can be stably detected for a long time. On the other hand, in the case of detecting a group of delineators or a guard rail, the same detection condition does not continue for a long time and, for this reason, a large number of target models disappear or appear newly. Accordingly, since it can be considered that a target model undergoing the detection for a long time is more likely to be a preceding vehicle, it is preferable that the adjustment value is changed according to the detection time.

Referring again to FIG. 4B, a one's-lane probability is calculated in a step S134. The "one's-lane probability" signifies a parameter representative of a certainty of a target model being a vehicle traveling on the same lane as that of the one's vehicle. In this embodiment, after the calculation of a one's-lane probability instantaneous value (value calculated on the basis of detection data at that moment), the one's-lane probability is obtained through predetermined filter processing.

First, the position of a target model is converted into a position to be taken when traveling on a straight road on the basis of a curve radius calculated in the curve radius calculation block 57. The position after the conversion into the straight road is put on a one's-lane probability map to obtain an instantaneous value of the one's-lane probability of the target model. In this case, the "one's-lane probability map" is a map in which a predetermined range (for example, 5 m in each of right and left directions and 100 m ahead) in front of one's vehicle is divided into a plurality of regions and a probability is allocated to each region so that the probability becomes higher as the distance thereto becomes shorter or it becomes closer to the course of the one's vehicle.

After the calculation of the instantaneous value of the one's-lane probability, the one's-lane probability is obtained through the filter processing, i.e., weighted mean, according to the equation (2).

one's-lane probability=last value of one's-lane probability×α+instantaneous value of one's-lane probability×(1−α)  (2)

In this case, α can be a constant value, or it can also be a value varying in accordance with the distance from the target model or a region in which the target model exists. Incidentally, the method of calculating the one's-lane probability is described in detail in Japanese Patent Laid-Open No. 2002-40139 (Paragraph Nos. 0050 to 0056), and the further description thereof will be omitted for simplicity.

Following this, a decision on recognition stability is made in a step S135. This recognition stability decision processing is for making a decision on recognition stability indicative of the degree of stable recognition of each target model. The recognition stability is set at a plurality of stages (for example, four stages) on the basis of a light-reception intensity of the reflected light, a time variation of the shape of a target model, an existence position and detection time of the target model, and a shape range of the target model. With respect to a state having the lowest recognition stability (stability 0), when, of the conditions including the aforesaid condition that the relative acceleration is abnormal and a condition that the detection time does not reach a predetermined time (for example, 4 seconds), at least one condition comes into existence (satisfied), a decision is made that the stability is zero.

With respect to the light-reception intensity of the reflected light, the reference intensity is set at least two stages (first reference intensity and a second reference intensity), and t is compared with the highest light-reception intensity of the light-reception intensities of a plurality of reflected light from a target model. When the highest light-reception intensity of the reflected light is higher than the first reference intensity, a decision is made that one of the decision satisfaction conditions on the highest stability 3 is satisfied. Moreover, when the highest light-reception intensity is lower than the first reference intensity but higher than second reference intensity, a decision is made that one of the decision satisfaction conditions on the stability 2 is satisfied, and when the highest light-reception intensity is lower than the second reference intensity, a decision is made that the stability is 1.

The reason that the magnitude of the highest light-reception intensity is used for the decision on the recognition stability is as follows. A vehicle has a higher reflection intensity than that of a non-vehicle, and if the highest intensity of the reflected light detected actually is the degree to which it is obviously distinguishable from a non-vehicle, stable recognition can be continued in a state where a target model involving a preceding vehicle is distinguished from a target model based on another reflecting object. Moreover, in a case in which the light-reception intensity is high, the S/N ratio on the light-reception intensity of the reflected wave becomes high, which improves the detection accuracy of the measurement data in the preceding vehicle such as a distance to the target model.

Furthermore, with respect to the time variation of the shape of a target model, in a case in which the difference between the last shape calculation value of a target model and the present shape calculation value, which are obtained on the basis of the measurement data detected at a predetermined internal (100 msec), does not reach a predetermined length, a decision is made that one of the decision satisfaction conditions on the stability 3 comes into existence. On the other hand, if it exceeds the predetermined length, a decision is made that the stability is 2 or less. Concretely, the width W and the depth D are employed as a shape of a target model, and when the difference between the width W calculated the last time and the width W calculated this time does not reach a predetermined length (for example, 0.5 m) and the difference between the depth D calculated the last time and the depth D calculated this time does not reach a predetermined length (for example, 0.5 m), a decision is made that one of the decision satisfaction conditions comes into existence.

The case in which the shapes of target models established on the basis of the measurement data obtained at different timings (different on time) are substantially the same signifies that a plurality of reflected lights corresponding to the target models have stably been detected. Therefore, in such a case, a decision can be made that the recognition stability is high.

Regarding the existence position of a target model, whether or not the target model exists in a predetermined distance range in a lateral direction with respect to the extension in the traveling direction of the one's vehicle is employed as a decision satisfaction condition on each recognition stability. Concretely, two distances (first distance: for example, 1 m in each of right and left direction, second distance: for example, 1.5 m in each of the right and left directions) are set as the distances to be used for detecting the shift in lateral directions with respect to the extension in the traveling direction of the one's vehicle. Moreover, in a case in which the target model exists within the first distance range, one of the decision satisfaction conditions on the stability 3 comes into existence, and in a case in which it is within the second distance range, one of the decision satisfaction conditions on the stability 2 comes into existence, and if it is out of the second distance range, a decision is made that the stability 1.

The reason that the existence position of the target model is used for the recognition stability decision is that the possibility of a preceding vehicle traveling on the same lane as that of the one's vehicle becomes higher as the preceding vehicle is brought closer to the extension in the traveling direction of the one's vehicle and, in this case, the possibility of the departure from the emission range of the laser radar sensor 5 is low and the relative speed Vz can be calculated with the highest accuracy on the basis of the measurement data.

Regarding the detection time, a plurality of reference times (first reference time: for example, 20 seconds, second reference time: for example, 10 seconds) are set. In a case in which the continuous detection time on the target model exceeds the first reference time, one of the decision satisfaction on the stability 3 comes into existence, and in the case of exceeding the second reference time, one of the decision satisfaction conditions on the stability 2 comes into existence, and in the case of not reaching the second reference time, a decision is made that the stability is 1. That is, when the duration of the actual detection of the target model is long, it is considered that the target model is a preceding vehicle and the possibility of the recognition being made stably is high.

Lastly, with respect to the shape of a target model, when it falls within a more vehicle-like shape range, a decision is made that one of the decision satisfaction conditions on higher recognition stability comes into existence. For example, in a case in which the width W of a target model exceeds 1.3 m but below 2.6 m and the depth D of the target model is below 0.5 m, since the possibility that the target model indicates a rear surface of a vehicle is high, a decision is made that one of the decision satisfaction conditions on the stability 3 comes into existence. Moreover, for example, in a case in which the width W of a target model exceeds 0.5 m but below 2.8 m and the depth D thereof is below 1.0 m, a decision is made that one of the decision satisfaction conditions on the stability 2 comes into existence, and if the width W and depth D thereof are out of these ranges, the decision indicates the stability 1.

The decision indicative of the recognition stability 3 or 2 is made when all the aforesaid conditions are satisfied, and if there is at least one condition which does not come into existence, a lower stability is applied thereto.

However, with respect to the decision on the recognition stability, there is not need to make a decision on all the above-mentioned conditions, and it is possible to use the other conditions additionally when needed while utilizing at least the highest light-reception intensity of a plurality of reflected lights from the target model. moreover, in addition to the above-mentioned conditions, it is also appropriate to use, for example, the vehicle shape probability of the target model or the distance to the target model. That is, a decision can be made that the satisfaction condition on higher stability is satisfied as the vehicle shape probability becomes higher or the distance thereto becomes shorter.

The recognition stability undergoing the decision in this way is put to use in calculating the relative speed Vz of a target model in the preceding vehicle decision block 53. A description will be given hereinbelow of a method of calculating the relative speed Vz while taking the recognition stability into consideration in the preceding vehicle decision block 53.

For controlling the inter-vehicle distance with respect to a preceding vehicle to a target (desired) distance, there is a need to calculate a relative speed Vz which is a difference in speed between oneself and a preceding vehicle (one's vehicle speed–preceding vehicle speed). That is, to approach the preceding vehicle, the traveling speed of the one's vehicle is controlled so that the relative speed Vz goes toward the "plus" direction. On the other hand, for prolonging the distance relative to the preceding vehicle, it is controlled so that the relative speed Vz goes to the "minus" direction. Therefore, the relative speed Vz forming the basis of such control requires precise calculation and, usually, for eliminating the influence of the noise, measurement error and others, an average relative speed Vzave is calculated on the basis of N relative speeds Vz calculated in time series, as expressed by the equation (3).

$$Vzave = (Vz1 + Vz2 + \ldots + VzN)/N \quad (3)$$

This average relative speed Vzave is used as the relative speed Vz in the inter-vehicle control. However, the inter-vehicle control using the average relative speed Vzave causes the shifting from the actual relative speed, which leads to the degradation of the response performance in the inter-vehicle control.

For this reason, in this embodiment, as mentioned above, a decision on the recognition stability of a target model forming a preceding vehicle is made through the use of the highest light-reception intensity of the reflected light. Moreover, when it is considered that the recognition stability shows a high value to improve the accuracy of the measurement data, the average relative speed Vzave is calculated in a state where the degree of influence of the latest relative speed Vz1 is increased, which can bring the average relative speed Vzave close to the latest relative speed Vz1, thereby improving the response performance in the inter-vehicle control.

Concretely, on the basis of the aforesaid recognition stability decision result, the number of relative speeds Vz to be used in calculating the average relative speed Vzave is set into four stages. That is, in the case of the stability 0, the average relative speed Vzave is calculated on the basis of the most relative speeds Vz, and the number N of relative speeds Vz is decreased as the recognition stability increases.

In this connection, it is also appropriate that, as expressed by the equation (4), the average relative speed Vzave is obtained through weighting-averaging calculation and the weight α is increased as the recognition stability increases. This also can enhance the influence of the latest relative speed Vz1 with respect to the average relative speed Vzave.

$$Vzave(N) = Vzave(N-1) \times (1-\alpha) + Vz1 \times \alpha \quad (4)$$

In addition to the recognition stability, the data on the target model, including the aforesaid vehicle shape probability and one's-lane probability, are outputted from the object recognition block 43 (see FIG. 1) to the preceding vehicle decision block 53. In the preceding vehicle decision block 53, of the target models whose vehicle shape probability exceeds a predetermined threshold (for example 50%) and whose one's-lane probability exceeds a predetermined threshold (for example, 50%), the target model having the minimum distance Z is decided to be a preceding vehicle. Moreover, the average relative speed Vzave to the preceding vehicle is calculated while changing the average relative speed Vzave calculation method in accordance with the recognition stability of the target model corresponding to the preceding vehicle. Together with the distance Z to the preceding vehicle, the calculated average relative speed Vzave is outputted as a relative speed Vz to the inter-vehicle control/alarm decision unit 55. Therefore, the inter-vehicle control/alarm decision unit 55 can implement the inter-vehicle control processing and the alarm decision processing on the basis of the distance Z to the preceding vehicle and the relative speed Vz.

(Second Embodiment)

Figure 5:
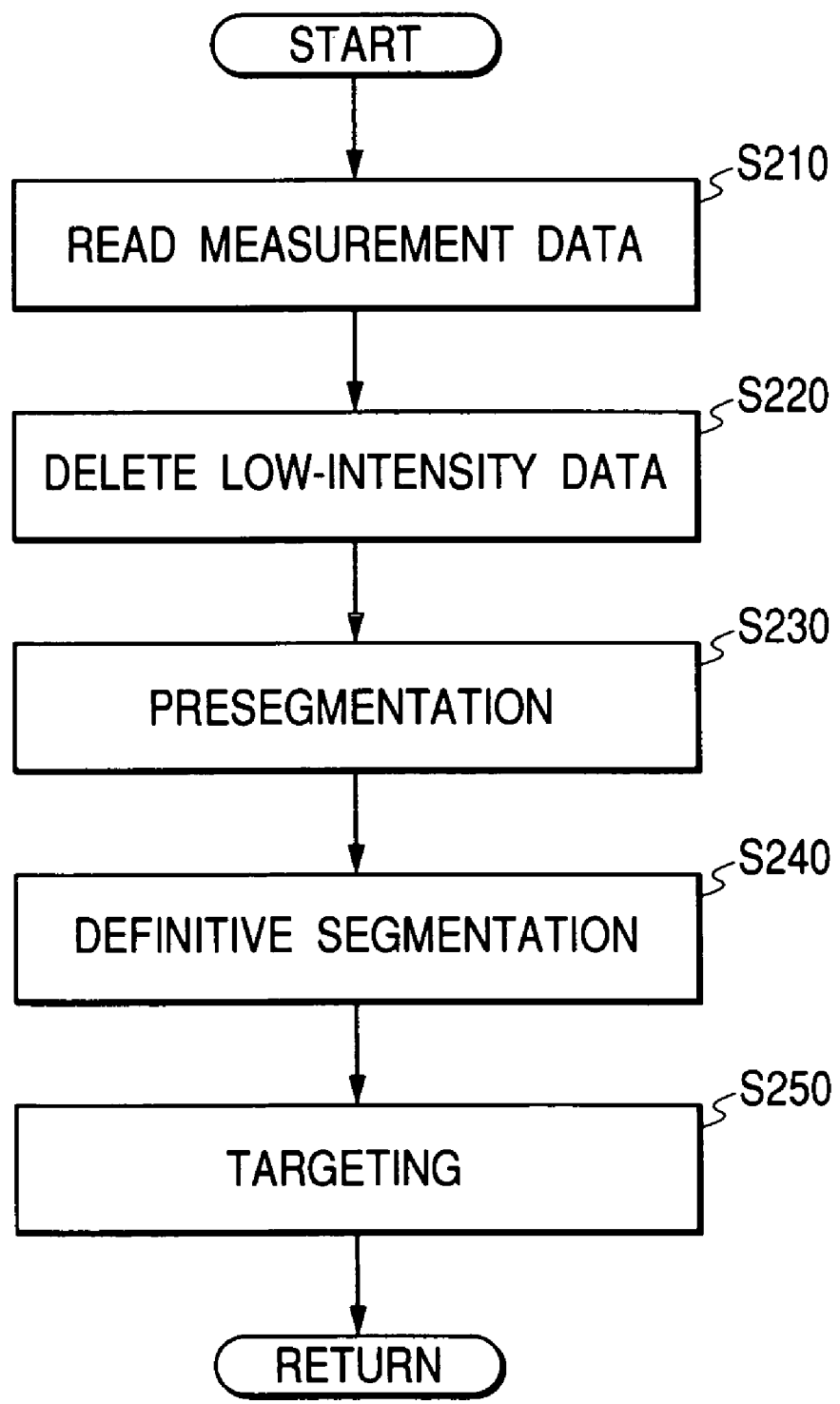
FIG. 5 is a flow chart showing processing on object recognition according to a second embodiment of the present invention.

Referring to FIG. 5, a description will be given hereinbelow of processing on object recognition to be implemented in the object recognition block 43 of the recognition/inter-vehicle control ECU 3 according to a second embodiment of the present invention. FIG. 5 is a flow chart showing main processing for the object recognition according to the second embodiment of the present invention.

In FIG. 5, a step S210 is executed to read the measurement data for each scanning line from the laser radar sensor 5. In the laser radar sensor 5, the measurement cycle for three scanning lines is 100 msec.

A step S220 follows to delete the data showing a low light-reception intensity. That is, the measurement data includes a pulse width of a stop pulse PB representative of the light-reception intensity of a reflected wave, and the pulse width thereof is compared with a deletion reference value to remove the measurement data showing a pulse width below a predetermined value. In addition, in the step S220, according to the pulse width of the stop pulse PB, the measurement data are classified into a high-light-reception-intensity group, an intermediate-light-reception-intensity group and a low-light-reception-intensity group. Concretely, three kinds of reference values to be compared with the pulse width are prepared, and the measurement data showing pulse widths exceeding the first reference value which is the highest of the reference values are classified as the high-light-reception-intensity group. Moreover, the measurement data pertaining to a pulse width range between the first reference value and a second reference value smaller than the first reference value is classified as the intermediate-light-reception-intensity group, and the measurement data falling within a range between the second reference value and a third reference value (<second reference value) is classified as the low-light-reception-intensity group. This third reference value corresponds to the above-mentioned deletion reference value, and the measurement data on the pulse widths below the third reference value are deleted.

In a step S230, presegmentation processing is conducted with respect to the measurement data, then followed by a step S240 to implement definitive (normal) segmentation processing on the measurement data undergoing the presegmentation processing. A detailed description will be given hereinbelow of the presegmentation processing and the definitive segmentation processing. The presegmentation processing corresponds to the first unification means in the present invention, and the definitive segmentation processing corresponds to the second unification means therein.

Figure 6:
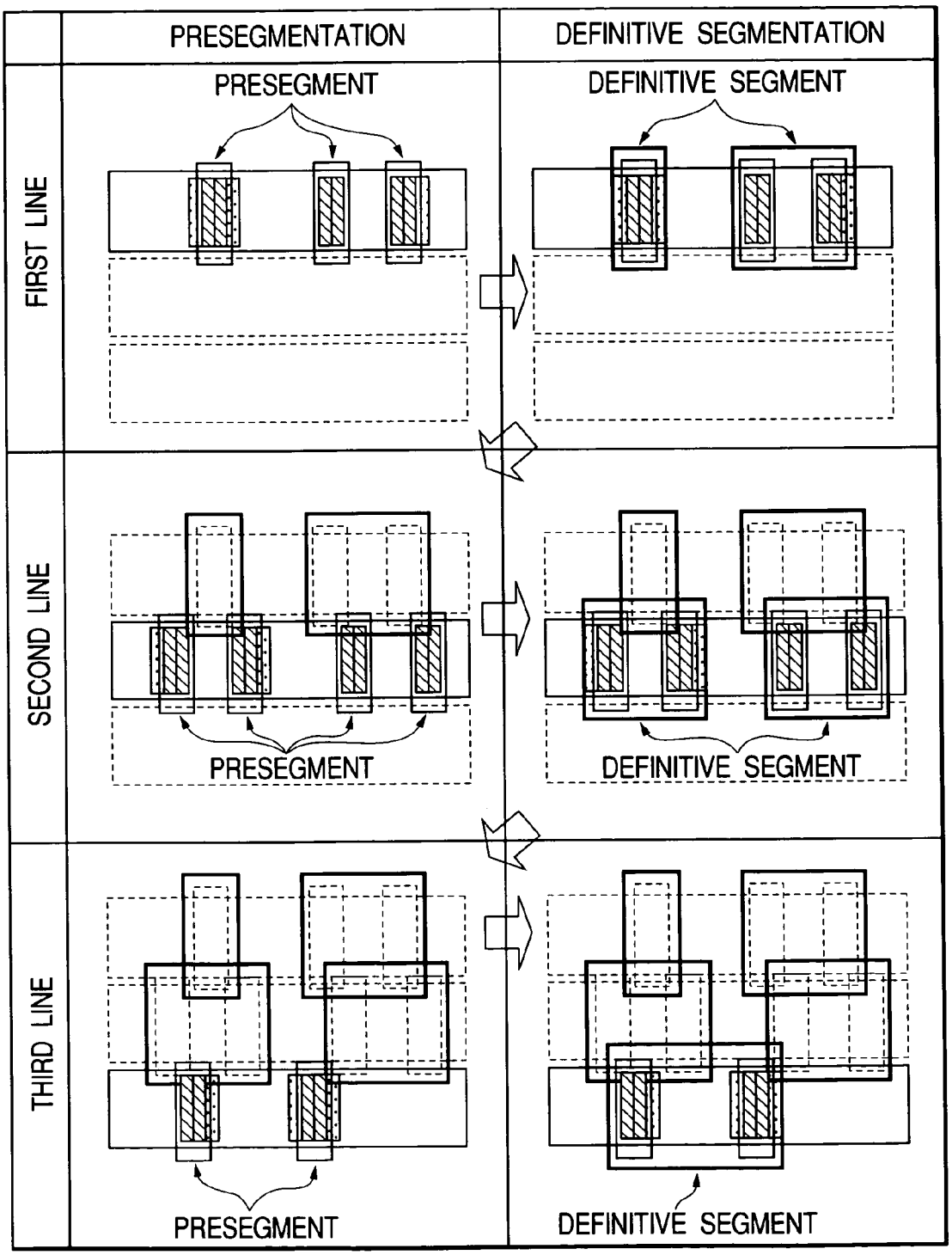
FIG. 6 is an illustration useful for explaining presegmentation processing and definitive-segmentation processing according to the second embodiment.

FIG. 6 is an illustration of flows of the presegmentation processing and the definitive segmentation processing and for explaining the outlines thereof. First, a decision will be given of the flows of the presegmentation processing and the definitive segmentation processing. As shown in FIG. 6, the presegmentation processing is conducted with respect to the measurement data on the first scanning line. That is, the measurement data satisfying a predetermined presegmentation condition (unification condition) are collected to produce a presegment. Subsequently, the definitive segmentation processing is conducted on the first scanning line measurement data presegmentized. In this definitive segmentation processing, when the presegments formed through the presegmentation processing satisfy a predetermined definitive segmentation condition (unification condition), they are connected to form a definitive segment. The presegmentation condition and the definitive segmentation condition will be described afterward.

Following this, the presegmentation processing and the definitive segmentation processing are conducted with respect to the second scanning line measurement data and, lastly, these processing are implemented on the third scanning line measurement data. In this way, the presegmentation processing and the definitive segmentation processing are successively conducted for each scanning line.

Figure 7A:
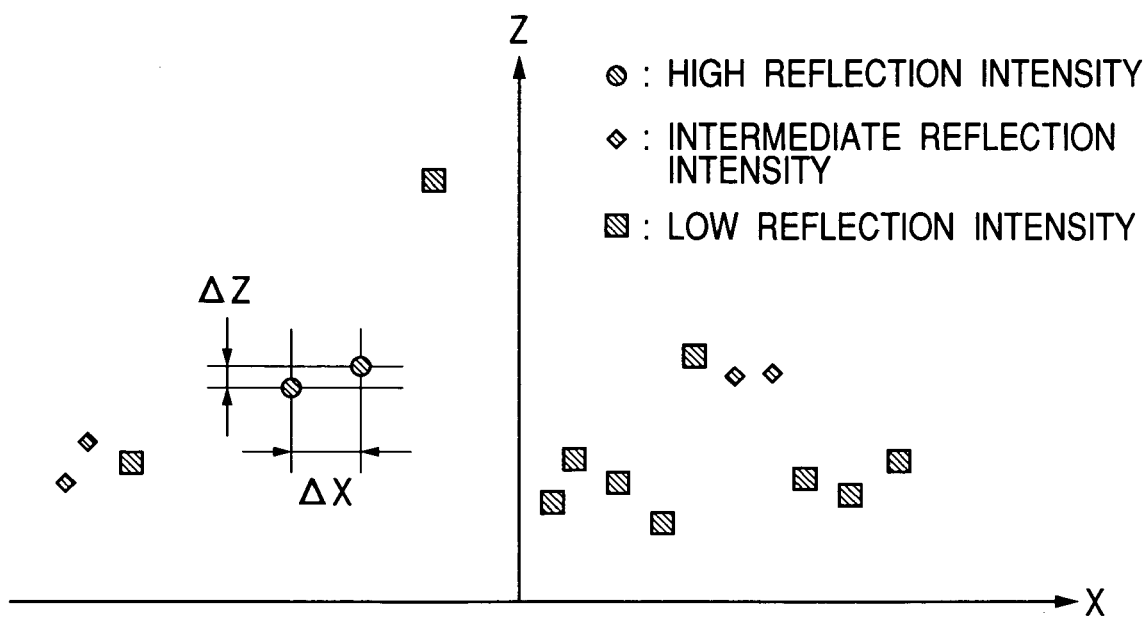
FIG. 7A is an illustration of measurement data converted into X-Z orthogonal coordinates.
Figure 7B:
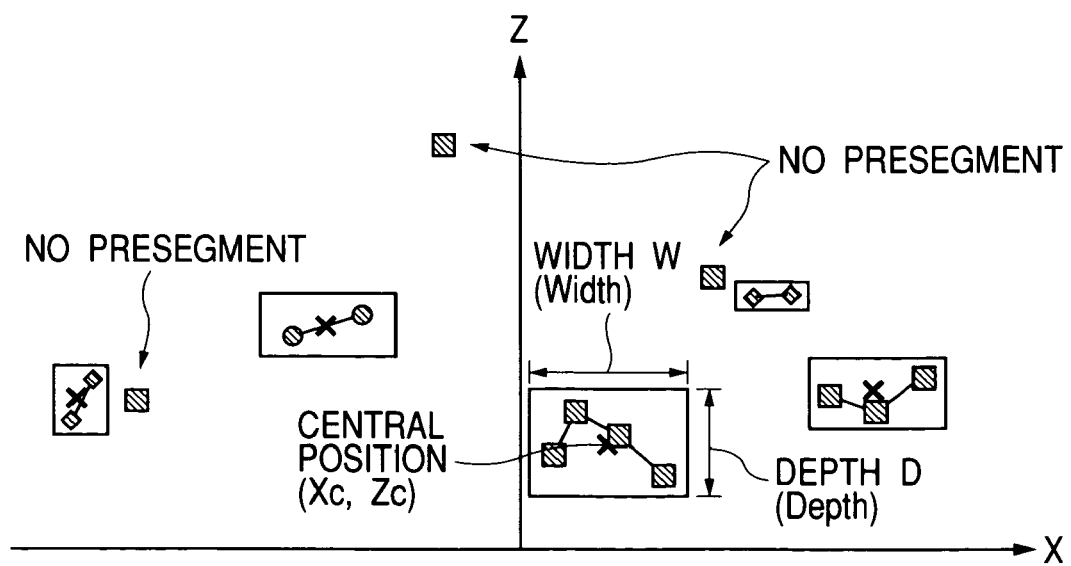
FIG. 7B is an illustration of data presegmentized.

Secondly, referring to FIGS. 7A and 7B, a detailed description will be given hereinbelow of the presegmentation processing, particularly, the presegmentation condition. FIG. 7A shows the measurement data converted into the X-Z orthogonal coordinates, while FIG. 7B shows data presegmentized.

As FIG. 7A shows, when the first scanning line measurement data are converted into the X-Z orthogonal coordinates, each of the measurement data indicates a reflecting object, existing in a forward direction of the vehicle, in the form of a point. When these point data indicative of the reflecting objects in the form of points meet the following three conditions (presegmentation conditions), these point data are unified to produce a presegment.

1) The difference $\Delta Z$ in distance in the Z-axis direction is below a predetermined distance.

2) The difference $\Delta X$ in distance in the X-axis direction is below a predetermined distance.

3) The light-reception intensities are classified as the same group.

Of the aforesaid conditions 1) to 3), the conditions 1) and 2) are fundamental conditions for the unification of a plurality of point data. That is, when the laser beams are reflected on the same reflecting object, particularly, the same preceding vehicle, the measurement data acquired from the reflected light thereof shows substantially the same distance in the Z-axis direction and reside within a distance range corresponding to the width of the vehicle.

However, a predetermined distance to be compared with the aforesaid distance difference $\Delta Z$ in the Z-axis direction is changed to become longer as the distance Z to the reflecting object becomes longer. For example, in a distance range up to a distance of 70 m from the reflecting object, the predetermined distance is set at 1.5 m, and in a distance range exceeding 70 m, the predetermined distance is set at 2.0 m. This is because the measurement accuracy at that distance tends to lower as the distance to the reflecting object prolongs.

Moreover, a predetermined distance to be compared with the distance difference $\Delta X$ in the X-axis direction is also changed to be longer as the distance Z to the reflecting object becomes longer. For example, in a distance range up to a distance of 10 m from the reflecting object, the predetermined distance is set at approximately 2 cm, and is gradually increased up to approximately 20 cm. In a case in which a plurality of laser beams are emitted throughout a predetermined angular range from the laser radar sensor 5, if a reflecting object lies at a short distance from the one's vehicle, more laser beams are reflected by the reflecting object and the interval between the laser beams at the arrival at the reflecting object becomes shorter. On the other hand, the interval between the laser beams prolongs with a longer distance Z to the reflecting object. Therefore, from the viewpoint of the resolution of the laser beams, as mentioned above, the X-axis direction distance condition of the pre-segmentation conditions is relaxed as the distance Z to the reflecting object prolongs.

In this connection, with respect to the distance in the X-axis direction, it is possible that, after the measurement data are converted into the X-Z orthogonal coordinates, the X-axis difference $\Delta X$ in distance between the point data is compared with the predetermined distance, and it is also appropriate that, on the basis of the number of laser beams residing between the laser beams corresponding to the measurement data forming the object of unification decision, a decision is indirectly made on the distance difference $\Delta X$ in the X-axis direction. That is, a decision indicating the satisfaction of the distance condition in the X-axis direction is made when the number of laser beams intervening between two laser beams is smaller than a predetermined number. This can lessen the calculation processing load for the decision on the X-axis distance condition.

In addition, when the decision on the X-axis distance condition is made on the basis of the number of laser beams intervening between two laser beams, the number of laser beams to be used for the unification decision is decreased as the distance Z to the reflecting object becomes longer. This is because the interval between the laser beams in the X-axis direction becomes longer with a longer distance Z to the reflecting object.

In this embodiment, in addition to the aforesaid conditions 1) and 2), a decision is made with respect to the condition on the light-reception intensity of each measurement data. That is, for collecting the measurement data showing a small difference in light-reception intensity to produce a presegment, that the light-reception intensities are classified as the same group (high-light-reception-intensity group, intermediate-light-reception-intensity group, low-light-reception-intensity group) is employed as one presegmentation condition.

A principal object of recognition in the vehicle object recognition apparatus is a preceding vehicle in front of the one's vehicle, and the preceding vehicle has reflectors symmetrically mounted on its rear surface in the right and left direction. The reflectors have a reflection intensity higher than that of a body of the vehicle. Therefore, the reflected waves from the reflectors do not become unstable unlike the reflected waves from the vehicle body portions, and the stable reception by the radar means becomes feasible.

Furthermore, since the measurement data whose light-reception intensities are classified as the same group are collected to produce a presegment, a portion (for example, vehicle body portion) showing a low reflection intensity and a portion (for example, reflector) showing a high reflection intensity are distinguishable from each other. In consequence, in producing a definitive segment by unifying the presegments, the calculation of the distance or shape of the definitive segment can be made with reference to the presegments showing a high reflected light intensity, which enables the correct acquisition of the distance, shape and the like of the definitive segment.

In addition, in the presegmentation processing, for eliminating the influence of noise such as extraneous light, when any one of the following two conditions 4) and 5) comes into existence, the corresponding measurement data is not handled as a presegment.

4) In a case in which the distance to a reflecting object is below a predetermined distance (for example, 100 m), the measurement data is not unified with other measurement data, that is, the reflected light is singly obtained with only one laser beam.

In the aforesaid predetermined distance range, a vehicle forming an object of recognition has a size to receive (strike) a plurality of laser beams and, usually, there is no possibility that only one laser beam exists independently in a state separated by over a predetermined distance organizing the aforesaid conditions 1) and 2) or that only one laser beam provides a light-reception intensity different from the other reflected lights. Therefore, when the measurement data is not unified with the other measurement data, it can be considered that the reflected light stems from noise occurring for some reason. Accordingly, the measurement data considered as noise is not handled individually as a presegment.

5) The number of measurement data to be unified is below a predetermined number (for example, two) and the light-reception intensities thereof are classified as the low-light-reception-intensity group.

Also in a case in which the reflected light intensity is low and the number of measurement data to be unified is below a predetermined number (including zero), the reflected light can be considered to be noise occurring for some reason.

When the measurement data shown in FIG. 7A are presegmentized according to the above-mentioned presegmentation conditions, five presegments are produced as shown in FIG. 7B. Moreover, with respect to each of the segments, the positions (X, Z) of the measurement data are averaged to obtain a central position Xc, Zc), and the width W and depth D thereof are obtained on the basis of the minimum value and the maximum value of the positions (X, Z) of the measurement data.

Referring again to FIG. 5, in the step S230, the definitive segmentation processing is conducted and, when the presegments produced from the measurement data obtained through one scanning line satisfy the definitive segmentation condition, they are unified into a definitive segment. Incidentally, the presegment which is not unified with other presegments directly becomes a definitive segment.

This definitive segmentation condition is that each of the differences in central position (Xc, Zc) among the presegments is below a unification decision distance ($\Delta X$, $\Delta Z$). This unification decision distance ($\Delta X$, $\Delta Z$) is changed according to the distance Z to the presegment. For example, in a distance range in which the distance z is shorter than 35 m, the difference $\Delta X$ in the X-axis direction is set to be below 15 cm and the difference $\Delta Z$ in the Z-axis direction is set to be below 1.5 m. Moreover, in a distance range in which the distance Z is from 35 m to 70 m, $\Delta X$ is below 20 cm and $\Delta Z$ is below 1.5 m. Still moreover, in a distance range above 70 m, $\Delta X$ is below 25 cm and $\Delta Z$ is below 2 m. The reason that the unification decision distance ($\Delta X$, $\Delta Z$) is changed according to the distance Z to the presegement is that the measurement accuracy and resolution of the laser beams are taken into consideration.

Figure 8:
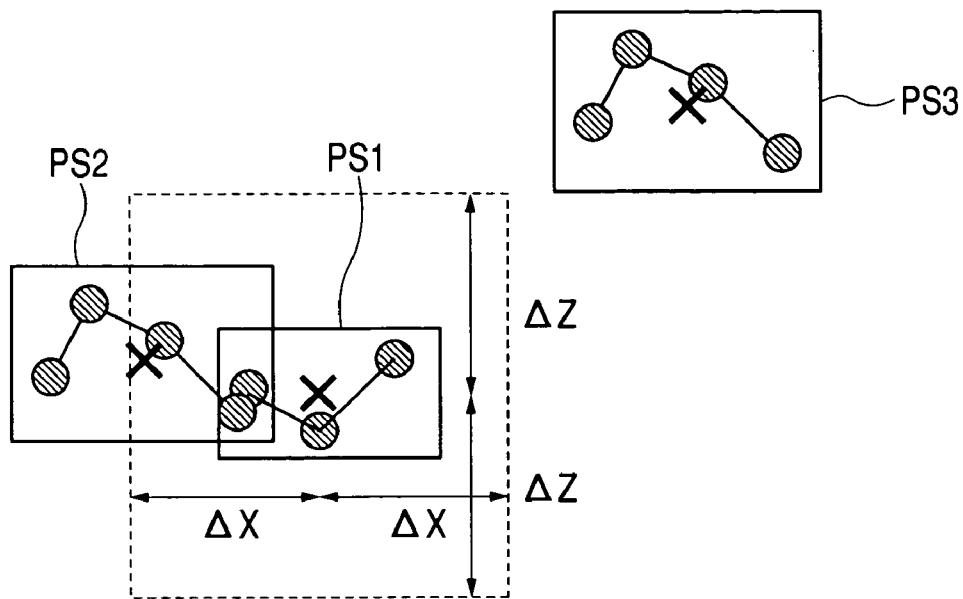
FIG. 8 is an illustration useful for explaining definitive-segmentation processing.

Thus, as shown in FIG. 8, areas based on the unification decision distances ($\Delta X$, $\Delta Z$) are set according to the distances Z to presegments PS1, PS2 and PS3 in the X-axis and Z-axis directions. For example, when the central position (Xc, Zc) of the presegment PS2 falls within the area set in conjunction with the presegment PS1, the presegments PS1 and PS2 are unified to form a definitive segment. Since the presegment PS3 is out of the area, the presegment PS3 is not unified with the presegments PS1 and PS2, but becoming a definitive segment independently.

However, in the definitive segmentation processing, for correctly seizing the distance to an object recognized as a definitive segment and the shape thereof, when a plurality of presegments are unified to form a definitive segment, the calculations of the distance to the definitive segment and the width thereof are made as follows.

First, the presegments for the calculation of the distance Z to the definitive segment are extracted on the basis of light-reception intensity. Concretely, the presegments whose light-reception intensity exceeds an intermediate value are extracted. However, in a case in which the presegment whose light-reception intensity exceeds an intermediate value is one in number and the number of measurement data constituting that presegment is one, the presegments whose light-reception intensity is low are also extracted. This is because one measurement data makes it difficult to calculate the depth and others of the definitive segment. Moreover, also in a case in which there is no presegement whose light-reception intensity exceeds an intermediate value, the presegments whose light-reception intensity is low are also extracted.

The distance Z to the definitive segment, and others, are calculated on the basis of the presegments extracted in this way. Concretely, the distance Z to the definitive segment is calculated as an average value of the distances Z to the extracted presegments. Moreover, of the distances Z to the extracted presegments, the minimum distance Zmin and the maximum distance Zmax are obtained to calculate the depth D of the definitive segment on the basis of the difference between the minimum distance Zmin and the maximum distance Zmax. The minimum distance Zmin and the maximum distance Zmax are obtained from the minimum value and the maximum value of the measurement data organizing the extracted presegments.

In this way, in principle, the presegments having the light-reception intensities exceeding the intermediate value are extracted to obtain the distance Z to the definitive segment and others through the use of the extracted prsegments, thereby enhancing the distance accuracy. That is, the reflected light having a high intensity is stably receivable by the laser radar sensor 5, and the accuracy of the distance to a reflecting object calculated on the basis of a light-reception signal based on such reflected light is extremely high. Therefore, when the distance Z and others are calculated on the basis of only the presegments whose light-reception intensity exceeds an intermediate value, the distance Z to the definitive segment, and others, are attainable with high accuracy.

Furthermore, a description will be given hereinbelow of a method of calculating the width W of a definitive segment. First, the width W of the definitive segment is calculated through the use of all the presegments. That is, the width W is calculated on the basis of the positions of the measurement data lying at the rightmost and leftmost portions in all the presegments. When the calculated width W is smaller than the maximum value W0 (for example, 2.7 m when errors are taken into consideration) of the widths the vehicles have usually, the calculated width W is directly taken as a width W.

However, if the calculated width exceeds the maximum value W0 and a definitive segment is made through the use of a plurality of presegments different in light-reception intensity from each other, the width of the definitive segment is calculated on the basis of the presegements except the presegments showing a low light-reception intensity. The possibility that an object having a width considerably exceeding the width of a vehicle exists in an existence area of a vehicle forming an object of recognition is extremely low. Therefore, in this case, it is presumable that the presegments having a low light-reception intensity originate from noise or the like and, hence, the width W is calculated with the exclusion of these prsegments.

However, as a result of excluding the presegments having a low light-reception intensity, if the width W becomes too small (for example, shorter than 1 m), the presegement exclusion does not take place. Likewise, even in a case in which the width W exceeds the maximum value W0, if all the light-reception intensities of the presegments are the same, the deletion of the presegments is not done. Moreover, after the calculation of the width W of the definitive segment, the central position of the definitive segment on the X axis is calculated on the basis of the calculated width W.

Figure 9:
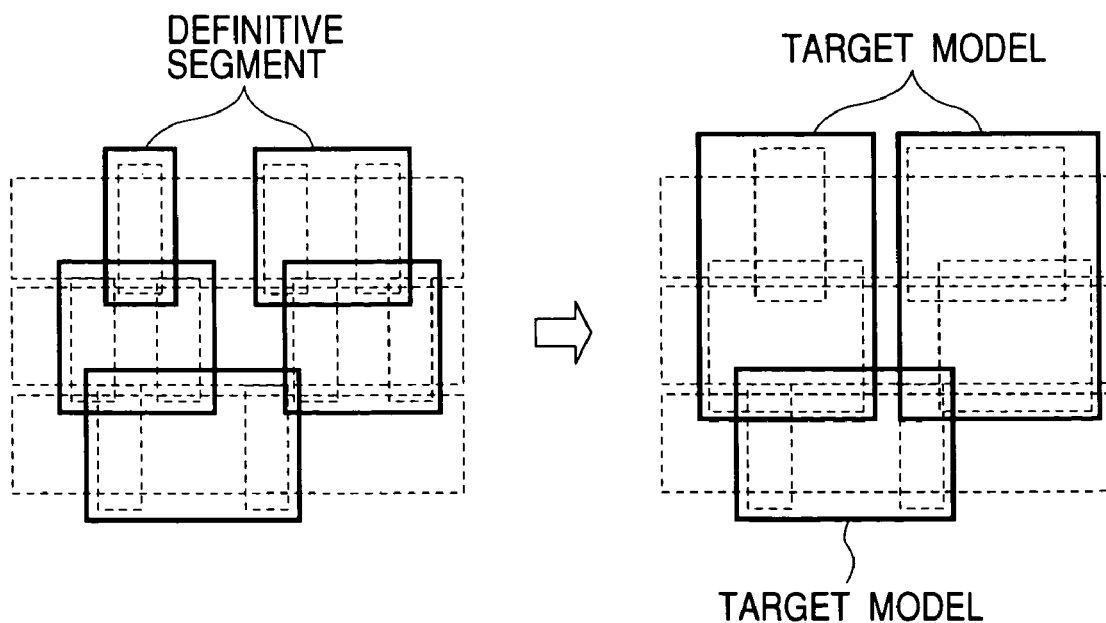
FIG. 9 is an illustration useful for explaining targeting processing.

When the definitive segments are formed for each scanning line in this way, the targeting processing is subsequently conducted in a step S250 of FIG. 5. In this targeting processing, as shown in FIG. 9, a decision is made as to whether or not to unify the definitive segments on each scanning line. The definitive segments undergoing the unification decision are connected to produce a unitary target model.

Figure 10:
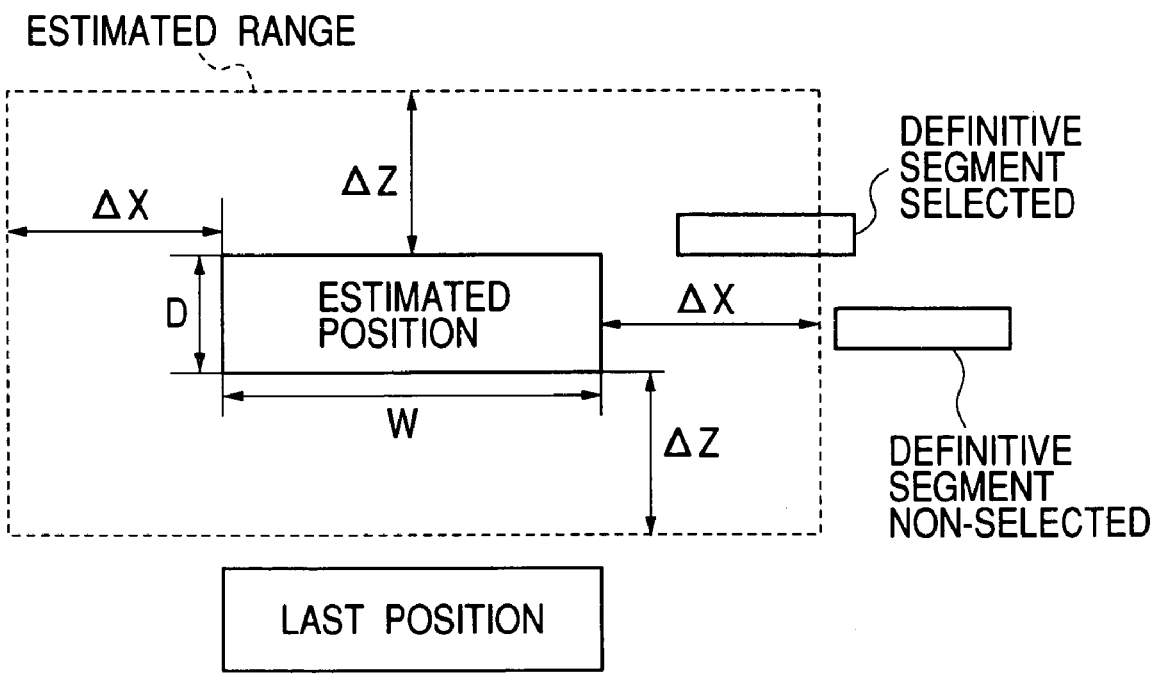
FIG. 10 is an illustration useful for explaining unification conditions in the targeting processing.
Figure 11:
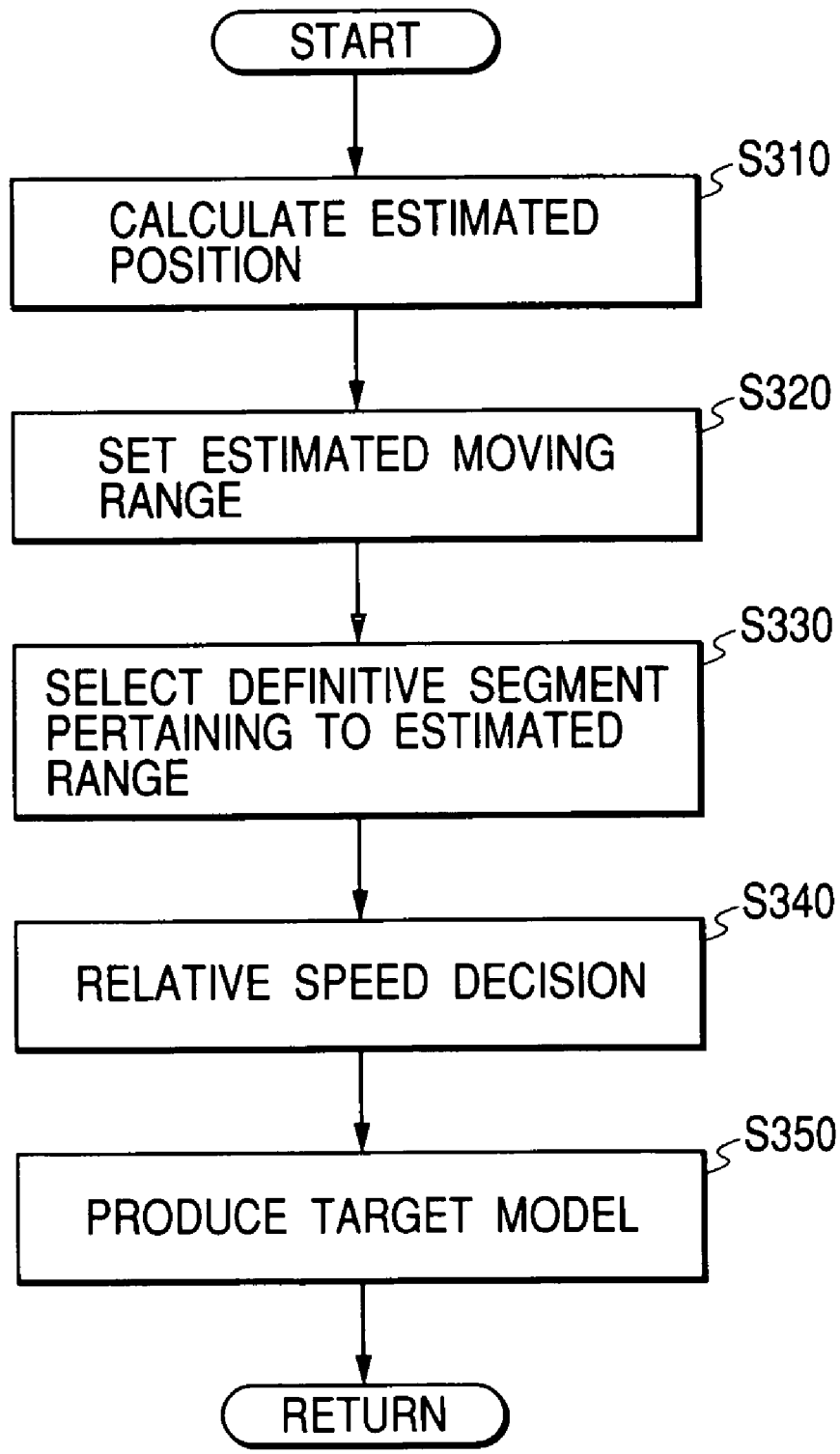
FIG. 11 a flow chart showing targeting processing according to the second embodiment.

Referring to FIG. 10 and a flow chart of FIG. 11, a description will be given hereinbelow of the targeting processing. In the targeting processing, in FIG. 11, a step S310 is executed to calculate an estimated position of each of definitive segments. That is, as shown in FIG. 10, assuming that the definitive segment moves from the position of the last processing at a relative speed of the last processing, an estimated position at which the definitive segment will exist is calculated. Subsequently, in a step S320, an estimated moving range having a predetermined length in each of the X-axis and Z-axis directions is set around the estimated position. Moreover, in a step S330 are selected the definitive segments at least partially included in the estimated moving range. The calculation of the position of the definitive segment with respect to the estimated moving range is made through the use of the minimum distance Zmin, the maximum distance Zmax, and the rightmost position and leftmost position of the corrected width W.

In a step S340, if a plurality of definitive segments are selected in the step S330, a decision is made as to whether or not the differences ($\Delta$Vx, $\Delta$Vz) in relative speed between the definitive segments in the X-axis and Z-axis directions fall below predetermined speed differences ($\Delta$Vx0, $\Delta$Vz0), respectively. Moreover, in a step S350, if the decision in the step S340 shows that the relative speed differences ($\Delta$Vx, $\Delta$Vz) fall below the predetermined speed differences ($\Delta$Vx0, $\Delta$Vz0), the plurality of definitive segments are regarded as unitary one and are unified to produce a target model. That is, the width Wm and the depth Dm are obtained on the basis of the X-axis and Z-axis minimum and maximum values of the measurement data pertaining to the plurality of definitive segments, and the distances to the definitive segments are averaged to obtain the distance Zm to the target model. Incidentally, the aforesaid predetermined speed differences ($\Delta$Vx0, $\Delta$Vz0) can be a constant value, or can be changed to increase as the traveling speed of the one's vehicle increases.

On the other hand, if the definitive segment included in the estimated moving range is one in number, this definitive segment is simply processed as a target model.

In addition, when the definitive segment corresponding to the definitive segment obtained the last time is specified, the data updating processing on the definitive segment is conducted for the next calculation of the estimated position and the like. Among the data to be updated, there are the central coordinates (Xc, Zc), width W, depth D and the X-axis and Z-axis relative speeds (Vx, Vz) of each definitive segment, the plural-times data on the central coordinates (Xc, Zc) in the past, and others. The definitive segment which does not pertain to any estimated range is registered as a new definitive segment.

As described above, with the targeting processing according to this embodiment, the differences in relative speed between the definitive segments in the X-axis and Z-axis directions are employed in making a decision as to whether or not the definitive segments obtained for each scanning line pertain to the same object. Accordingly, even in a case in which a moving object such as a preceding vehicle and a stationary object such as a signboard accidentally come close to each other, or even if preceding vehicles approach each other, they can certainly be distinguishable and recognizable as different objects.

(Third Embodiment)

A distance measurement apparatus according to a third embodiment of the present invention is also applicable to a vehicle control apparatus shown in FIG. 1.

Figure 12:
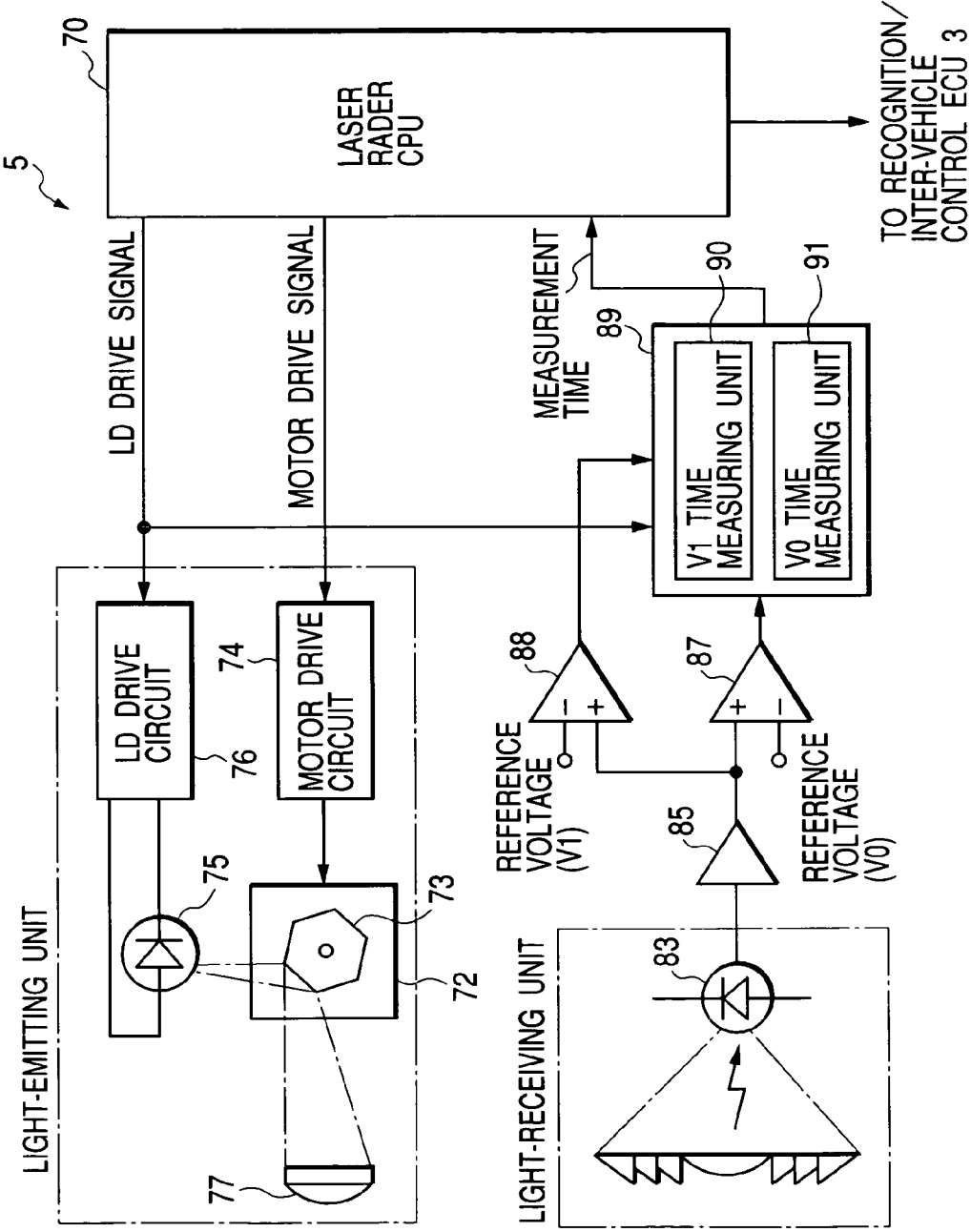
FIG. 12 is a block diagram showing a configuration of a laser radar sensor according to a third embodiment of the present invention.

First of all, referring to FIG. 12, a description will be given hereinbelow of a laser radar sensor 5 of a distance measurement apparatus according to the third embodiment of the present invention. In FIG. 12, the parts corresponding to those in FIG. 2A are marked with the same reference numerals.

In this embodiment, the laser sensor 5 successively performs the scanning within an area of approximately 7.8 degree in each of right- and left-side directions with respect to a center axis of a vehicle toward the forward direction of the vehicle. Concretely, the scanning is made from the left-side direction to the right-side direction, and 105 transmission laser beams whose horizontal beam numbers are 0 to 104 are emitted at an interval of 0.15 degree. That is, the horizontal beam number 0 corresponds to −7.8 degree and the horizontal beam number 104 corresponds to +7.8 degree. Since these laser beams are emitted through a glass place 77, if water drops attach onto the glass plate 77 at, for example, a rain, the laser beams can scatter.

On the other hand, the light-receiving unit includes a light-receiving lens 81 for receiving a laser beam reflected by an object (not shown) and a light-receiving element 83 for outputting a voltage corresponding to the intensity (strength) of the received light. The output voltage of the light-receiving element 83 is inputted to an amplifier 85 which in turn, amplifies this inputted voltage at a predetermined magnification and outputs it to comparators 87 and 88. This amplifier 85 cannot amplify the voltage at the predetermined magnification in the case of the reception of light with a high light-reception intensity, that is, it can fall into a saturated condition.

The comparator 87 compares the output voltage (V) of the amplifier 85 with a preset reference voltage (V0) and outputs a predetermined reception signal to a time measuring circuit 89 when the output voltage (V) agrees with the reference voltage (V0). This reference voltage (V0) is set in order to avoid the influence of noise components, and it will be referred to hereinafter as a "lower threshold (V0)". The comparator 88 compares the output voltage (V) of the amplifier 85 with a preset reference voltage (V1) and outputs a predetermined reception signal to the time measuring circuit 89 when the output voltage (V) agrees with the reference voltage (V1). For example, this reference voltage (V1) is set on the basis of a voltage level to be normally outputted when the reflection occurs by a reflector or the like mounted on a rear portion of a vehicle, and it will be referred to hereinafter as an upper threshold (V1).

Figure 21A:
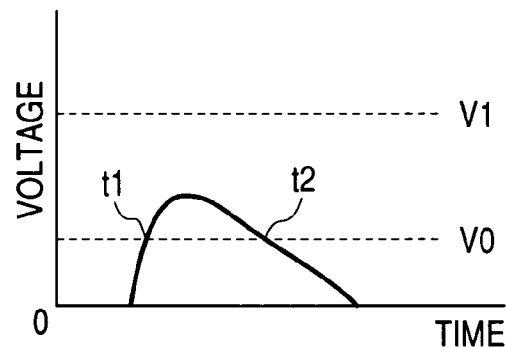
FIGS. 21A to 21D are illustrations of examples of detection of reflected waves according to the third embodiment.
Figure 21B:
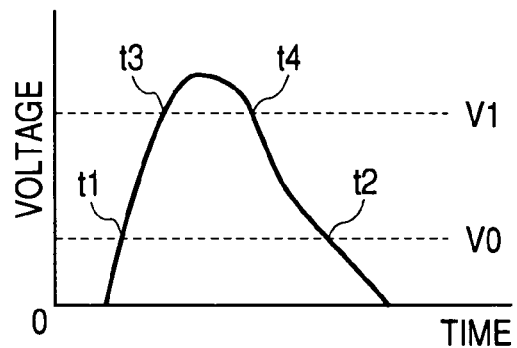
Figure 21C:
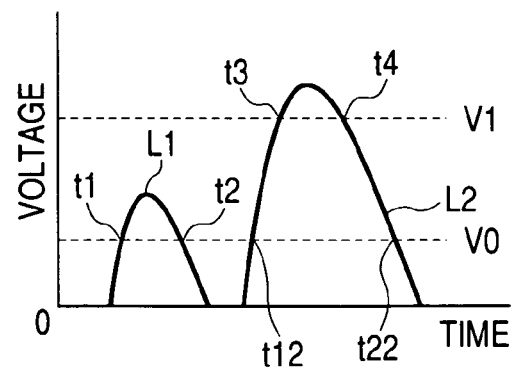

The time measuring circuit 89 includes a V1 time measuring unit 90 for measuring the start time and end time of a light length for which the output voltage (V) exceeds the upper threshold (V1) and a V0 time measuring unit 91 for measuring the start time and end time of a time width for which the output voltage (V) exceeds the lower threshold (V0). In the time measuring circuit 89, for example, when an output voltage is inputted as shown in FIG. 21A, the V0 time measuring unit 91 measures two times (t1 and t2). Moreover, if an output voltage exceeding the upper threshold (V1) is inputted as shown in FIG. 21B, the V0 time measuring unit 91 measures two times (t1 and t2) and the V1 time measuring unit 90 measures two times (t3 and t4). That is, the time measuring circuit 89 measures a maximum of four times (t1, t2, t3 and t4).

In this embodiment, each of the V1 time measuring unit 90 and the V0 time measuring unit 91 measures the start time and the end time when the output voltage (V) first exceeds the upper threshold (V1) or the lower threshold (V0). Accordingly, in a case in which a plurality of reflected waves (L1, L2) are detected in conjunction with the emission of one laser beam, the V1 time measuring unit 90 measures the times (t3 and t4) on the basis of the reflected wave (L2) and the V0 time measuring unit 91 measures the times (t1 and t2) on the basis of the reflected wave (L1) but not measuring the times (t12 and t22) from the reflected wave (L2).

This is because, even if the V0 time measuring unit 91 can measure the times (t12 and t22) on the basis of the reflected wave (L2), it is impossible to specify which of the reflected waves (L1 and L2) the V1 time measuring unit 90 measures the times (t3 and t4) from. That is, for example, although the specification of the reflected wave becomes feasible in a manner such that the timings of the measurement by the V1 time measuring unit 90 and the V0 time measuring unit 91 are synchronized with each other, a time period longer than the processing time needed for the time measurement on the output voltage is required for transmitting the synchronizing signal, and in the configuration according to this embodiment, the synchronization is actually impossible.

Figure 21D:
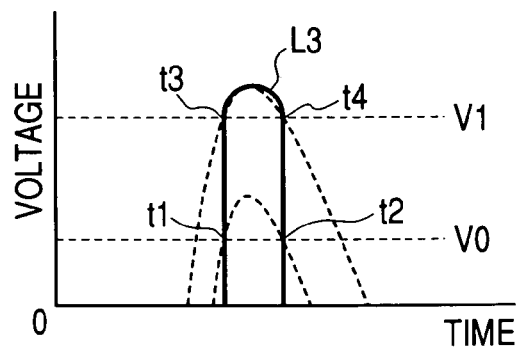

Accordingly, in a case in which a plurality of reflected waves are detected in conjunction with one laser beam, a reflected wave (L3), which is not to be received in principle, is detected as shown in FIG. 21D.

Moreover, a drive signal to be outputted from a laser radar CPU 70 to a laser diode drive circuit 76 is also inputted to the time measuring circuit 89, and the time (ts) of the input of this drive signal and a maximum of four times t1 to t4) are encoded into binary digital signals and inputted to the laser radar CPU 70. The coded data will be referred to as "time data".

The laser radar CPU 70 obtains a distance (distance data) from a reflecting object on the basis of the time data comprising the input time (ts) and the maximum of four times (t1 to t4), and outputs the measurement data including this distance data, a rotation angle (scan angle) of the polygon mirror 73 and a light-reception intensity (Δt), which will be mentioned later, to the recognition/inter-vehicle control ECU 3. In this connection, the laser radar CPU 70 depends upon the following principle for obtaining the distance data and the light-reception intensity.

Figure 19:
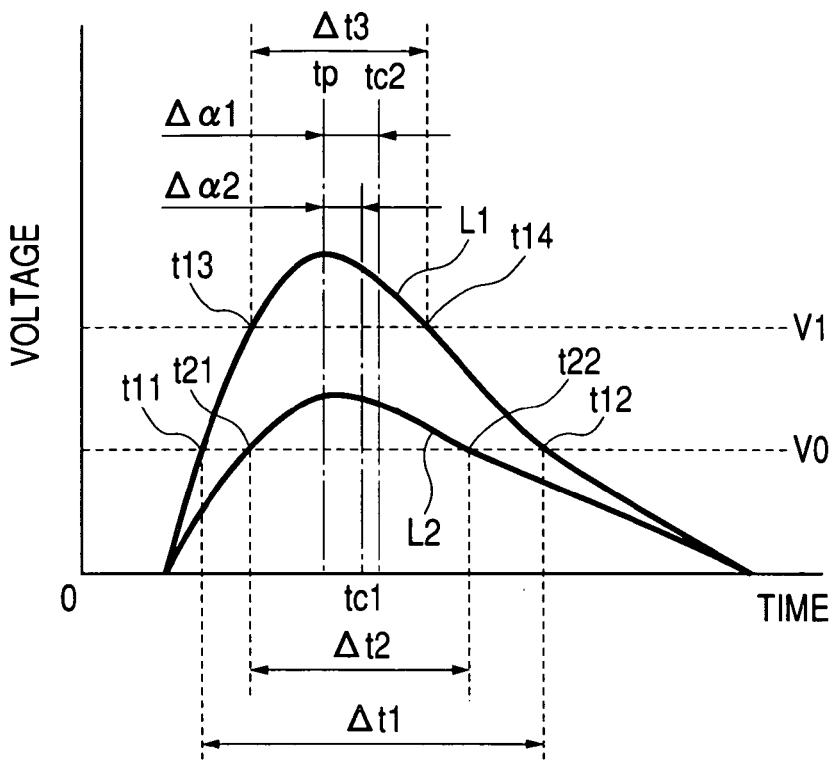
FIG. 19 is an illustration of received waveforms for explaining correction processing at the calculation of measurement data according to the third embodiment.
Figure 20:
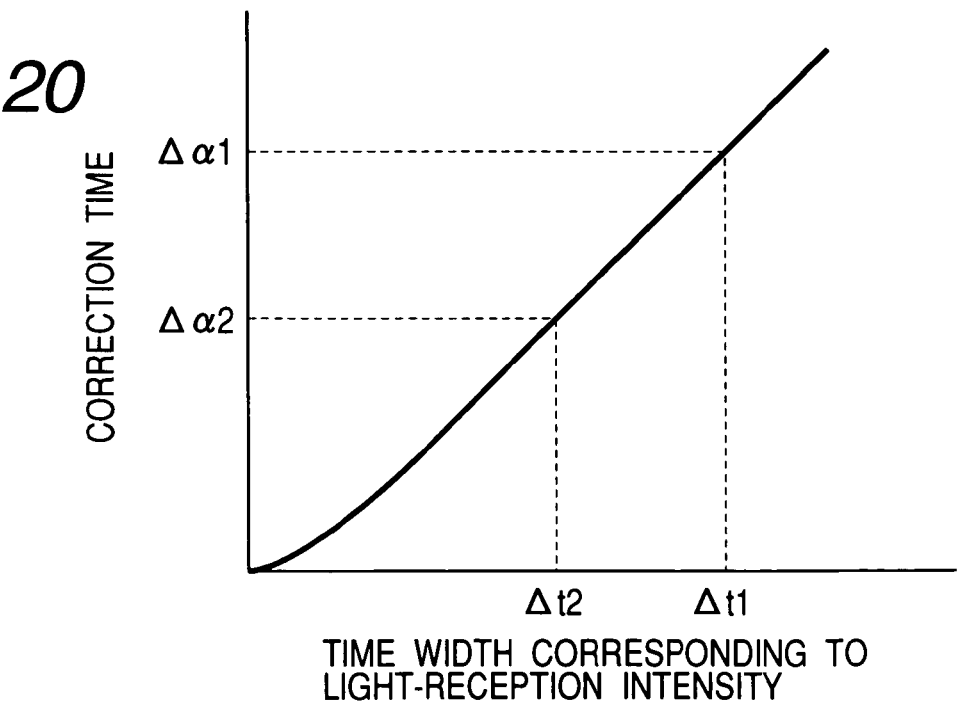
FIG. 20 is an illustration of a corresponding relationship between a time width corresponding to a light-reception intensity and a correction time according to the third embodiment.

FIG. 19 is an illustration of received waveforms for explaining the processing to be conducted for the calculation of the distance data. In FIG. 19, a curve L1 depicts a received waveform in the case of the reception of a reflected wave with a high light-reception intensity and a curve L2 denotes a received waveform for the reception of a reflected wave with a low light-reception intensity. FIG. 20 shows the association between a time width (time length) corresponding to a light-reception intensity and a correction time.

In FIG. 19, the time at which the curve L1 intersects with the lower threshold (V0) set by the comparator 87 in its rising state is taken as t11, the time at which the curve L1 intersects with the lower threshold (V0) in its falling state is taken as t12, and the time difference between the time t11 and the time t12 is taken as Δt1. Moreover, the time at which the curve L2 intersects with the lower threshold (V0) in its rising process is taken as t21, the time at which the curve L2 intersects with the lower threshold (V0) in its falling process is taken as t22, and the time difference between the time t21 and the time t22 is taken as Δt2.

In addition, the time at which the curve L1 intersects with the upper threshold (V1) set by the comparator 88 in its rising state is taken as t13, the time at which the curve L1 intersects with the upper threshold (V1) in its falling state is taken as t14, and the time difference between the time t13 and the time t14 is taken as Δt3.

As obvious from FIG. 19, when the time difference Δt1 corresponding to a reflected wave with a high light-reception intensity is compared with the time difference Δt2 corresponding to a reflected wave with a low light-reception intensity, the relationship of Δt1>Δt2 comes into existence. That is, the degrees of the time differences (Δt1, Δt2) determined in accordance with the times (t11, t12, t21, t22) at which the received waveform s intersect with the lower threshold (V0) correspond to the light-reception intensities, and the aforesaid time difference becomes small (Δt2) when the light-reception intensity is low, while the time difference becomes large (Δt1) when the light-reception intensity is high. Therefore, these time differences (Δt1, Δt2) act as an index (barometer) characterizing the light-reception intensity of the received waveform.

Still additionally, an intermediate time between the time t11 and the time t12 is taken as tc2, an intermediate time between the time t21 and the time t22 is taken as tc1, the time at which the curves L1 and L2 reach a maximum voltage is taken as tp, the time difference between the intermediate time tc2 and the time tp at which they reach the maximum voltage is taken as Δα1, and the time difference between the intermediate time tc1 and the time tp is taken as Δα2. The time differences between the intermediate times (tc2, tc1) and the time tp at which they reach the maximum voltage are referred to as "correction times (Δα1, Δα2)".

Thus, a predetermined association (corresponding relationship) lies between time widths (Δt1, Δt2) corresponding to the aforesaid light-reception intensities and the correction times (Δα1, Δα2). That is, as shown in FIG. 20, the correction time tends to increase monotonically as the time width corresponding to the light-reception intensity increases. Therefore, after the association shown in this illustration is acquired in advance through experiments or the like, a correction time is obtained on the basis of a time width corresponding to a light-reception intensity and the intermediate times (tc2, tc1) are corrected into the time tp of the arrival at the maximum voltage on the basis of the obtained correction time so that a distance to an object is measured on the basis of the time difference between the time (ts) of the emission from the laser diode 75 and the time (tp) of the arrival at the maximum voltage.

Thus, the measurement error stemming from the difference of the light-reception intensity of a reflected wave is corrected by the correction time and the distance to the object is measured as a time difference up to the same time tp. The relationship between the time width corresponding to a light-reception intensity and a correction time can be stored in a ROM or the like in the form of a map.

In this connection, in the case of a reflected wave with a high light-reception intensity such as the curve L1, it can intersect with the upper threshold V1. In this case, a time width Δt11 (not shown) between the times t13 and t14 of the intersection with the upper threshold V1 and an intermediate time tc22 (not shown) thereof are obtained and a correction time is obtained from a previously prepared map representative of the relationship between a time width and a correction time. Moreover, the intermediate time tc22 is corrected and a distance to the object is measured on the basis of a time difference with respect to the time of the arrival at the maximum voltage.

The recognition/inter-vehicle control ECU 3 thus arranged uses the measurement data from the laser radar sensor 5 to recognize an object on the basis of the measurement data, the light-reception intensity (Δt) of which satisfies a predetermined condition, and the scan angle, and outputs drive signals to the brake driver 19, the throttle driver 21 and the automatic transmission controller 23 in accordance with the situation of the preceding vehicle acquired from the object recognition for controlling the vehicle speed, thus implementing the so-called inter-vehicle control. Moreover, the alarm decision processing is simultaneously made to issue an alarm, for example, in a case in which the recognized object exists in a predetermined alarm zone for a predetermined time period. In this case, the object is a preceding vehicle running or vehicle stopping in front of the one's vehicle, a guard rail or column residing at roadsides, or the like.

Figure 13:
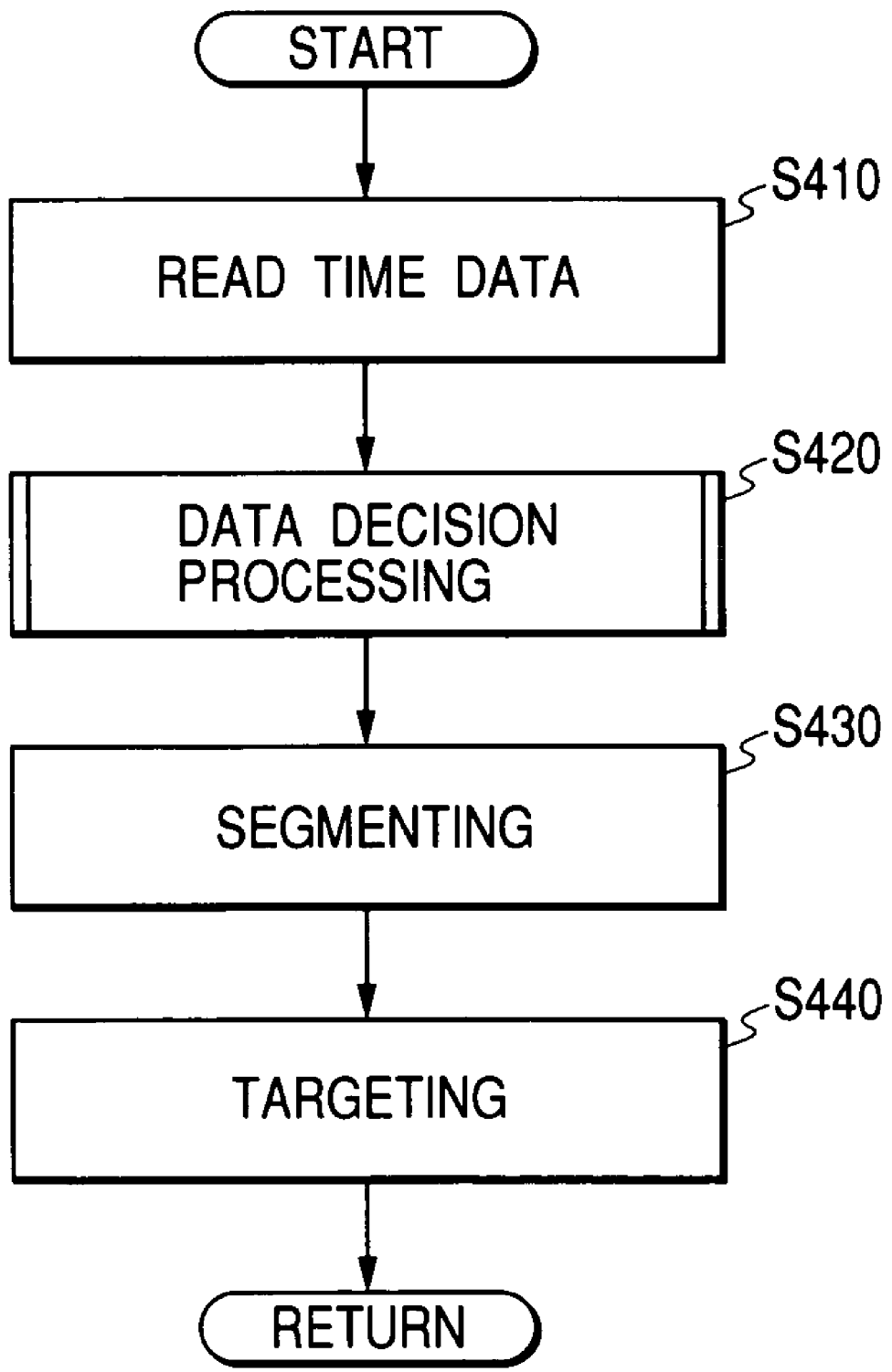
FIG. 13 is a flow chart showing object recognition processing according to the third embodiment.

Secondly, a description will be given hereinbelow of an operation for the calculation of the measurement data and the object recognition to be implemented in the laser radar CPU 70 (see FIG. 12) and the object recognition block 43 (see FIG. 1). FIG. 13 is a main flow chart showing the entire recognition processing.

In FIG. 13, in a step S410, the laser radar sensor 5 reads the time data corresponding to one scan from the time measuring circuit 89. In the laser radar sensor 5, the scanning cycle is 0.1 second, and the data is read at a time interval of 0.1 second.

A step S420 follows to implement the decision processing (data decision processing) on whether or not a distance to an object is obtained from the time data, then followed by a step S430 to segment the data. The distance data and the scan angle are converted from the pole coordinate system into the X-Z orthogonal coordinate system, and the converted data are grouped to form segments. In this embodiment, each of the objects is recognized as a point, and when two conditions come into existence, that is, if the distance between the data recognized as the points in the X-axis direction is below 0.2 m and the distance therebetween in the Z-axis direction is below 2 m, the point sets are unified to obtain the segment data. The segment data forms a rectangular area having two edges parallel to the X axis and the Z axis and having a size set to include the unified point sets, with the data contents being the central coordinates (X, Z) and two-edge data (W, D) indicative of the size.

A step S440 is then implemented to conduct the targeting processing for targeting each of the objects of recognition such as a vehicle. As the contents of the targeting, the central position (X, Z) and size (W, D) of the object are obtained on the basis of the segment data obtained in the step S430, and the relative speeds (Vx, Vz) of the obstacle such as a preceding vehicle with respect to the position of the one's vehicle are obtained on the basis of the time variation of the central position (X, Z). Moreover, the assortment recognition as to whether the object is a stopping object or a moving object is conducted and an object exerting the influence on the traveling of the one's vehicle is selected on the basis of the recognized assortment and the central position of the object, and the distance to the object is displayed on the distance indicator 15. A target model having such data is outputted from the object recognition block 43 to the preceding vehicle decision block 53 (see FIG. 1)

Referring to flow charts of FIGS. 14 to 17, a description will be given hereinbelow of the data decision processing forming a feature portion of this embodiment.

Figure 14:
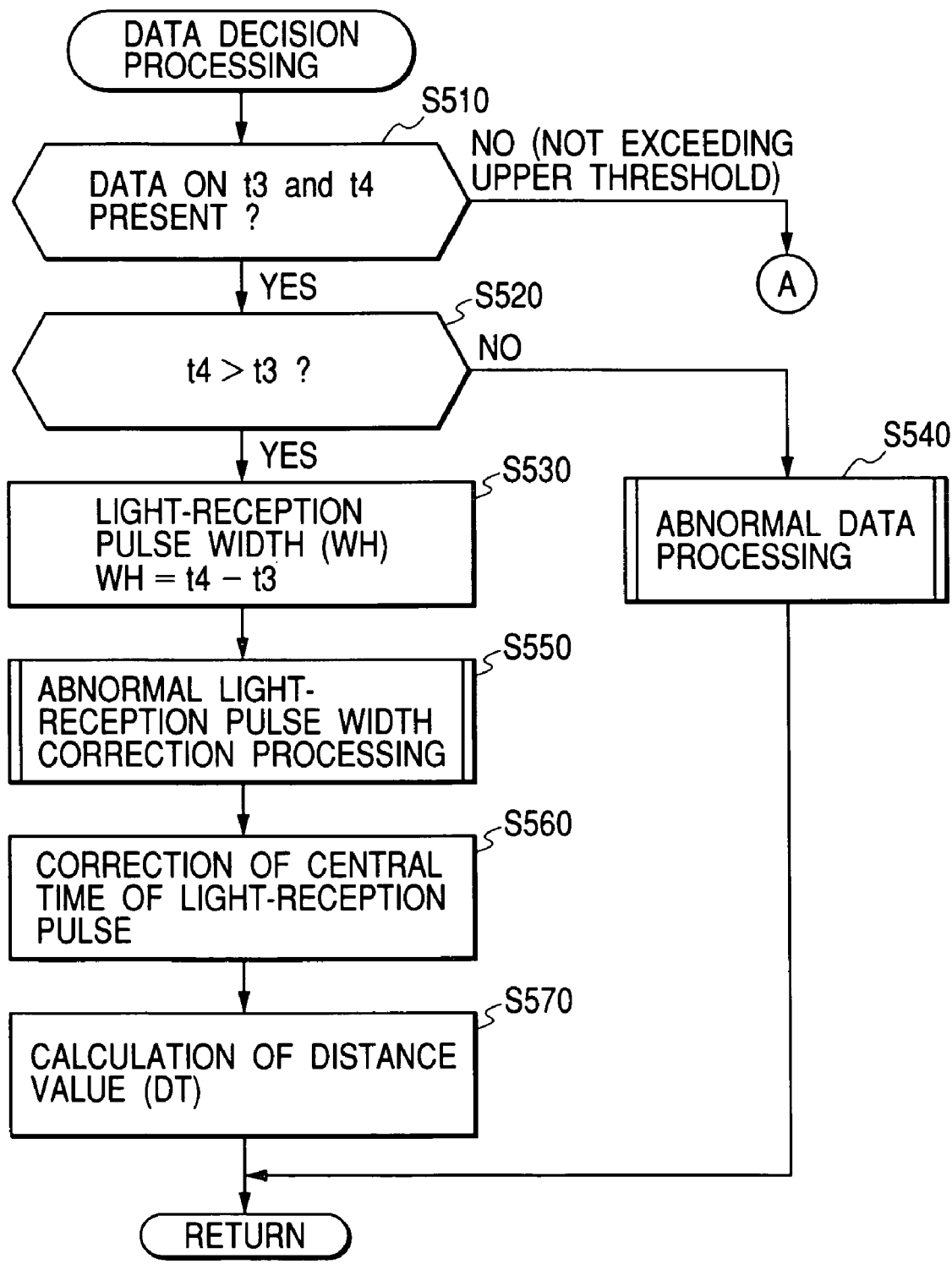
FIG. 14 is a flow chart showing measurement data decision processing, which is for calculating a distance on the basis of a reflected wave exceeding an upper threshold, according to the third embodiment.

In FIG. 14, in a step S510, a decision is made as to whether or not the data on the times (t3, t4) which agree with the upper threshold (V1) exist in the time data. That is, a decision is made as to whether or not the detected reflected wave exceeds the upper threshold (V1). If both the data on the times (t3, t4) exist, the operational flow advances to a step S520, and if the data on the times (t3, t4) do not exist, the operational flow goes to a step S600 which will be mentioned later.

In the step S520, a decision is made on the relationship in magnitude between the time (t3) and the time (t4). If the time (t4) shows a value larger than that of the time (t3), the operational flow advances to a step S530. Otherwise, the operational flow proceeds to a step S540 to execute the abnormal data processing. In this abnormal data processing, as shown in a flow chart of FIG. 17, in a step S800, when the measurement data shows an abnormal value or when the measurement data is not obtained, no-data (null) is substituted for the distance value (DT). In a step S810, when light-reception pulse width data which will be mentioned later is not obtained, the no-data (null) is substituted for the variables (WH, WL) of the light-reception pulse width data.

In the step S530, a light-reception pulse width (WH) is calculated on the basis of the times (t3, t4) agreeing with the upper threshold (V1), thereby calculating the time width (time length) for which the reflected wave exceeds the upper threshold (V1). A step S550 follows to conduct the correction processing on the light-reception pulse width. This correction processing will be described hereinbelow with reference to a flow chart of FIG. 16.

Figure 16:
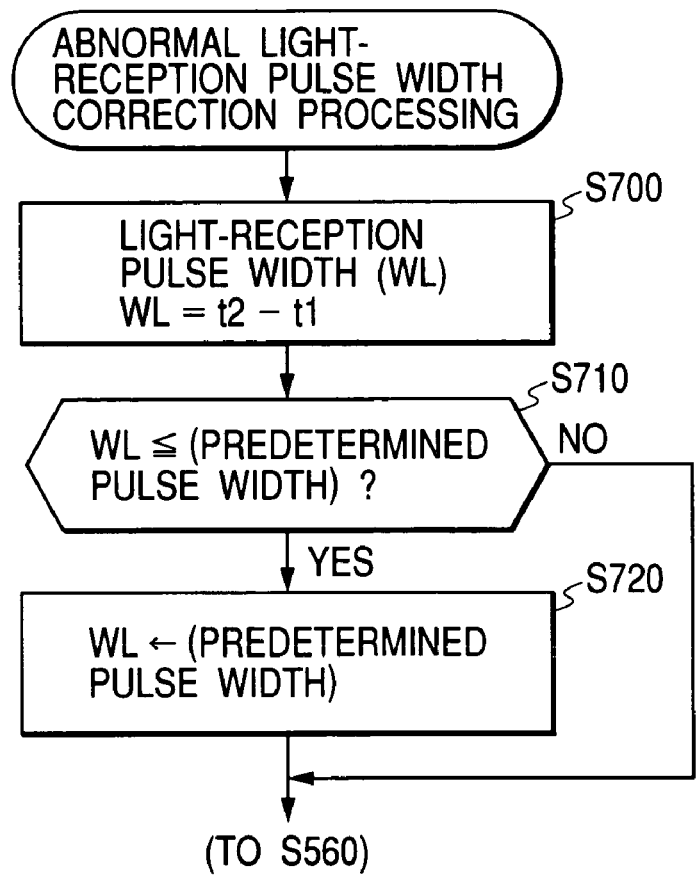
FIG. 16 is a flow chart showing processing, which is for correcting an abnormal light-reception pulse width, according to the third embodiment.
Figure 17:
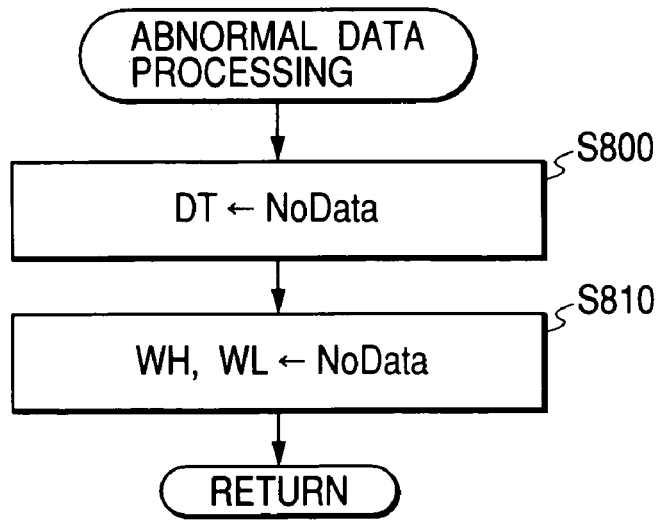
FIG. 17 is a flow chart showing abnormal data processing according to the third embodiment.

In FIG. 16, in a step S700, a light-reception pulse width (WL) is calculated on the basis of the times (t1, t2) agreeing the lower threshold (V0). This light-reception pulse width (WL) becomes data corresponding to the light-reception intensity (Δt). In a step S710, a decision is made on the relationship in magnitude between the light-reception pulse width (WL) and a predetermined pulse width. If the light-reception pulse width (WL) is less than the predetermined pulse width, a step S720 follows to substitute the predetermined pulse width for the light-reception pulse width (WL).

On the other hand, if the decision in the step S710 shows that the light-reception pulse width (WL) exceeds the predetermined pulse width, the operational flow goes to a step S560 for calculating the final distance value (DT). Thus, the distance to a reflecting object can be detected through the use of a reception signal satisfying the correlation between the light intensity of the reflected wave and the light-reception pulse width (light-reception intensity).

In this case, the predetermined pulse width is set to be a time width, for which the output voltage exceeds the lower threshold (V0), which normally takes place when the output voltage exceeds the upper threshold (V1). That is, in a case in which, although the output voltage exceeds the upper threshold (V1), the time width for which the output voltage (V) exceeds the lower threshold (V0) does not reach the predetermined pulse width, it is considered that a plurality of reflected waves are detected with respect to one laser beam emitted. Therefore, when the light-reception pulse width (WL) is replaced with the predetermined pulse width, it is possible to compensate for a peculiar detection result occurring due to the restriction imposed on the software.

In a step S560, the central time of the pulse width calculated from the light-reception pulse width (WH) and the aforesaid correction processing is then conducted on the central time to obtain the time (tp) at which it reaches the maximum voltage. Moreover, in a step S570, the distance value (DT) to the object is calculated on the basis of the time difference between the time (ts) at which the laser diode 75 emits light and the time (tp) at which the reflected wave reaches the maximum voltage.

Figure 15:
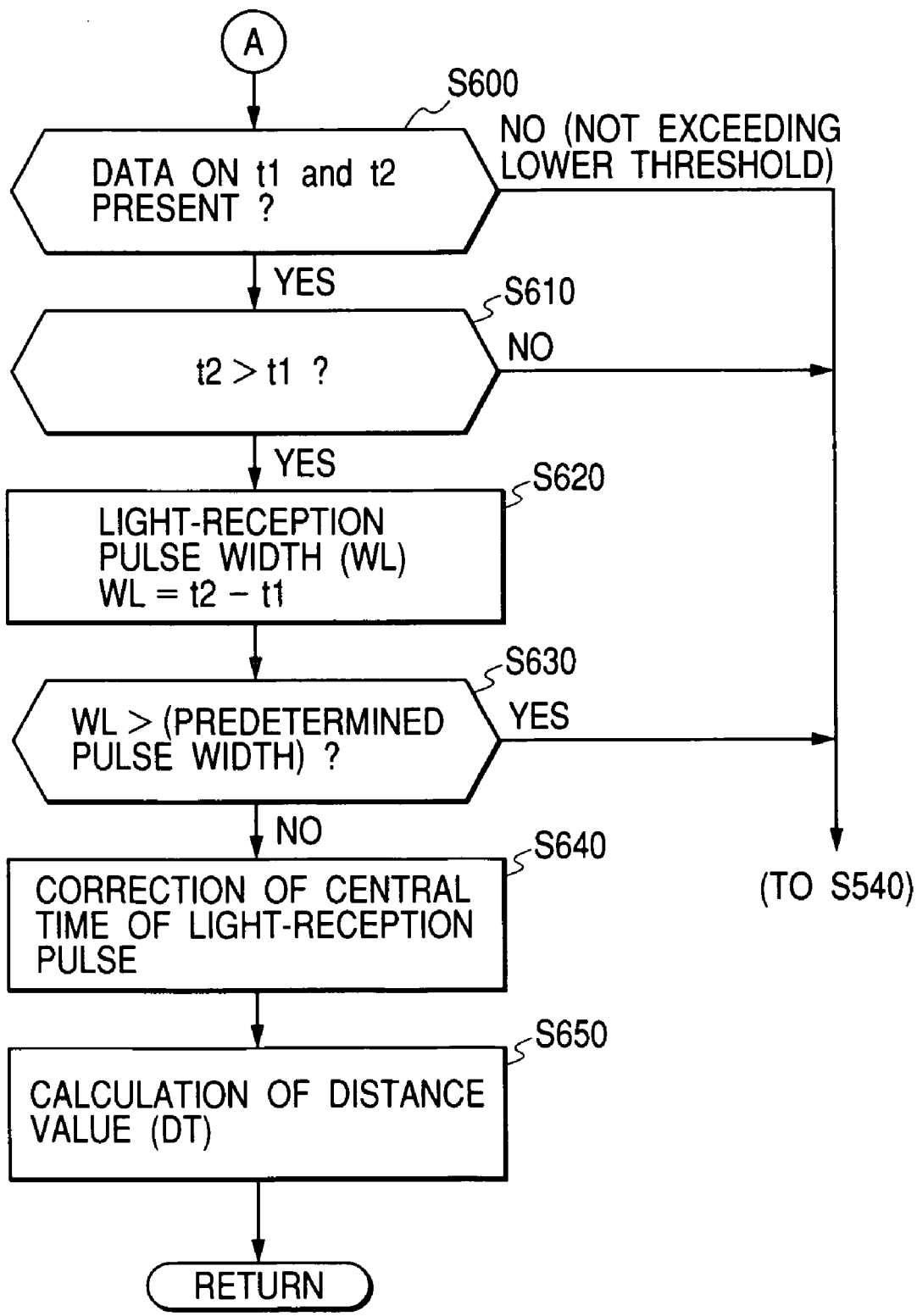
FIG. 15 is a flow chart showing measurement data decision processing, which is for calculating a distance on the basis of a reflected wave exceeding a lower threshold, according to the third embodiment.

On the other hand, if the decision in the step S510 indicates "No", that is, when the data on the times (t3, t4) agreeing with the upper threshold (V1) do not exist in the time data, the operational flow proceeds to the step S600 in FIG. 15.

In the step S600, a decision is made as to whether or not the data on the times (t1, t2) coinciding with the lower threshold (V0) exist in the time data. That is, a decision is made as to whether or not the detected reflected wave exceeds the lower threshold (V0). If both the data on the times (t1, t2) exist therein, the operational flow goes to a step S610, and if the time (t1, t2) data do not exist therein (not exceeding the upper threshold), the operational flow proceeds to the step S540 for the abnormal data processing. When the lower threshold (V0) is set as a value affected by the noise components in this way, it is possible to prevent the distance to the reflecting object from being detected on the basis of a reception signal including much noise component.

In the step S610, a decision is made on the relation ship in magnitude between the time (t19 and the time (t2), and if the time (t2) takes a value larger than that of the time (t1), the operational flow advances to a step S620. Otherwise, the operational flow goes to the step S540 for the abnormal data processing. In the step S620, a light-reception pulse width (WL) is calculated on the basis of the times (t1, t2) coinciding with the lower threshold (V0), thereby calculating the time width for which it exceeds the lower threshold (V0).

In a step S630, a decision is made on the relationship in magnitude between the calculated light-reception pulse width (WL) and a predetermined pulse width. If the light-reception pulse width (WL) is larger than the predetermined pulse width, the operational flow advances to the step 540 for the abnormal data processing. On the other hand, if the decision in the step S630 indicates that the light-reception pulse width (WL) does not reach the predetermined pulse width, the operational flow advances to a step S640. In this case, the predetermined pulse width is a time width, for which the output voltage exceeds the lower threshold (V0), which normally takes place when the output voltage exceeds the upper threshold (V1).

That is, in a case in which, although the output voltage does not exceed the upper threshold (V1), the light-reception pulse width (WL) is larger than the predetermined pulse width, as mentioned above, it is considered that a reflected wave looking like two reflected waves overlap is detected. Therefore, in this case, it is handled as abnormal data to prevent the distance to an object from being calculated on the basis of a detection result on a reflected wave whose light-reception pulse width exceeds the predetermined pulse width. This enables avoiding the detection of the distance to the reflecting object on the basis of a reception signal of a reflected wave apparently having a large time width due to the environmental influence such as spray of water or black smoke.

In a step S640, the central time of the pulse width is calculated on the basis of the light-reception pulse width (WL) and the aforesaid correction processing is then conducted on the central time to obtain the time (tp) of the arrival at the maximum voltage. Moreover, in a step S650, the distance (DT) to the object is calculated on the basis of the time difference from the time (ts) of the light emission from the laser diode 75 to the central time (tp) of the arrival at the maximum voltage.

In addition, the measurement data including the distance value (DT) as the distance data is sent from the laser radar sensor 5 to the object recognition block 43, and the object recognition block 43 conducts the object recognition on the basis of this measurement data.

In this way, the vehicle control apparatus according to this embodiment makes a decision as to whether or not the voltage value corresponding to the amplitude of the detected reflected wave and the magnitude of the light-reception pulse width satisfy a predetermined relationship and, if the predetermined relationship comes into existence, implements the distance measurement. That is, for example, in the case of the employment of an outputting means made to detect an optical wave and output a reception signal corresponding to the intensity of the optical wave, when light with a high intensity is detected, the amplitude and wavelength of the reception signal become large, and when light with a low intensity is detected, the amplitude and wavelength of the reception signal becomes small.

Accordingly, when the distance to the reflecting object is detected on the basis of the reception signal satisfying this relation of the amplitude and the wavelength, it is possible to more accurately make a decision as to whether or not the reception signal is to be used for the distance measurement.

In this embodiment, although the laser radar sensor 5 using laser light is employed, it is also possible to employ a device using millimetric wave, ultrasonic wave, or the like.

(First Modification)

In this embodiment, for the correcting the central time of the light-reception pulse width into the time (tp) of the generation of the maximum voltage, although the correction is made on the basis of the magnitude of the light-reception pulse width as shown in FIG. 20, the characteristic shown in this illustration varies in a case in which the distance value (DT) is a short distance below a predetermined distance. In particular, in the case of a reflected wave from a reflecting object existing at a short distance (for example, within 30 m), the error becomes large.

Figure 22:
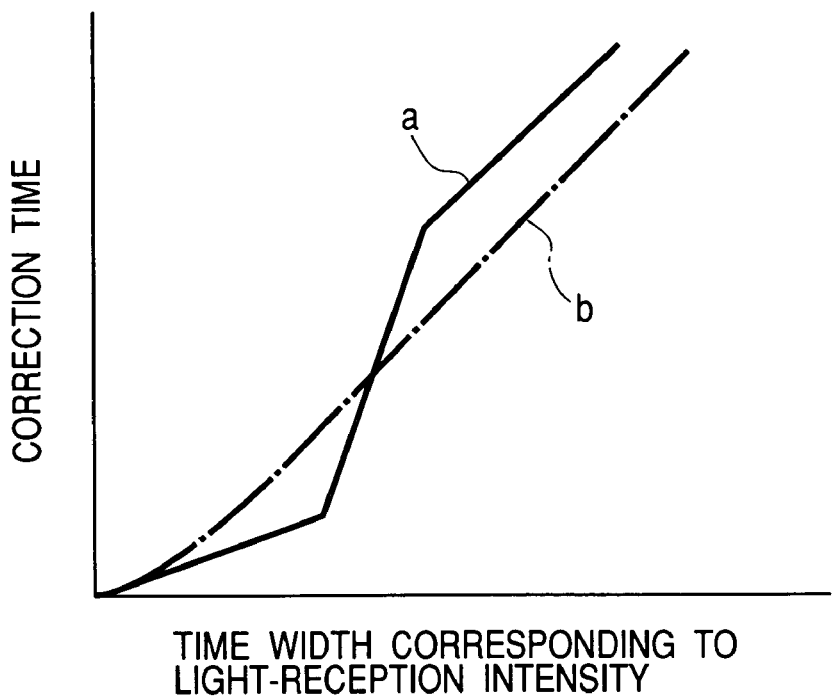
FIG. 22 is an illustration of a light-reception pulse width at a short distance and a correction time according to a second modification of the third embodiment.
Figure 23:
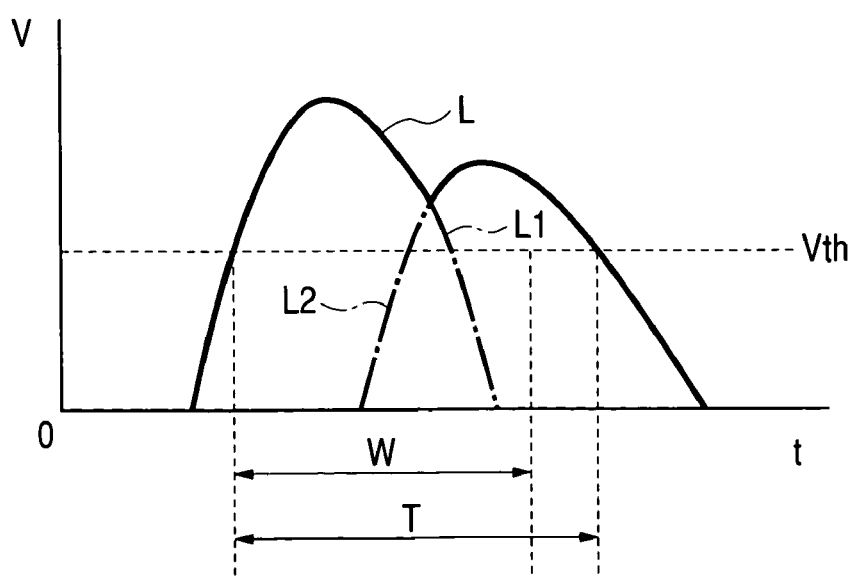
FIG. 23 is an illustration of detection of one reflected wave looking like two reflected waves (L1 and L2) overlap.

That is, the correction of the central time based on only the magnitude of the light-reception pulse width encounters the limitation when the correction is made on the whole distance measuring area with high accuracy. For example, when the distance to the reflecting object is short as indicated by a line a in FIG. 22, in an area in which the light-reception pulse width is short, the time difference (correction time) between the central time of the light-reception pulse width and the time (tp) becomes smaller, as compared to the case (line b in the illustration) in which the distance to the reflecting object is long. Moreover, in an area in which the light-reception pulse width is long, the time difference between the central time of the light-reception pulse width and the time (tp) tends to become large.

For this reason, in this modification, a decision is made as to whether or not the distance value (DT) is smaller than a predetermined value, and if the distance value (DT) is below the predetermined value, the correction processing on the distance value (DT) is made through the use of a correction map comprising a light-reception pulse width and a distance.

A description thereof will be given hereinbelow with reference to a flow chart of FIG. 18 and the maps of FIGS. 24A and 24B. The following processing is conducted after the step S570 in FIG. 14 or after the step S650 in FIG. 15.

Figure 18:
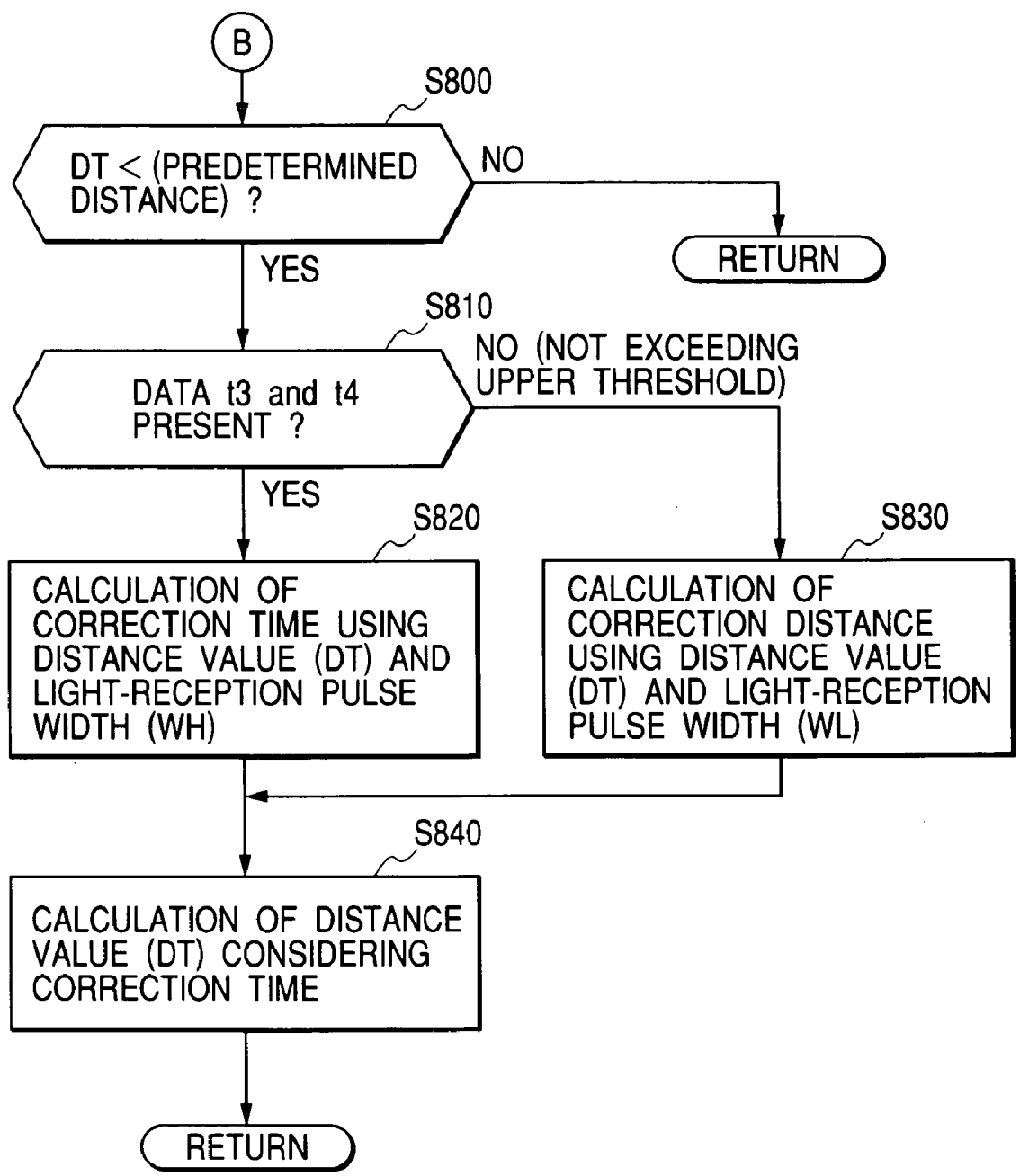
FIG. 18 is a flow chart showing distance correction processing for a short distance according to a first modification of the third embodiment.

In FIG. 18, in a step S800, a decision is made as to whether or not the calculated distance value (DT) is shorter than a predetermined distance. If the decision in the step S800 shows that the distance value (DT) is below than the predetermined distance, the operational flow advances to a step S810, and if the distance value (DT) exceeds the predetermined distance, this processing terminates without making the correction according to the map.

In the step S810, a decision is made as to whether or not the data on the times (t3, t4) agreeing with the upper threshold (V1) exist in the time data. That is, a decision is made on whether or not the detected reflected wave exceeds the upper threshold (V1). If both the data on the times (t3, t4) exist therein, the operational flow advances to a step S820, and if the time (t3, t4) data do not exist therein (when the detected reflected wave does not exceed the upper threshold), the operational flow proceeds to a step S830.

Figure 24A:
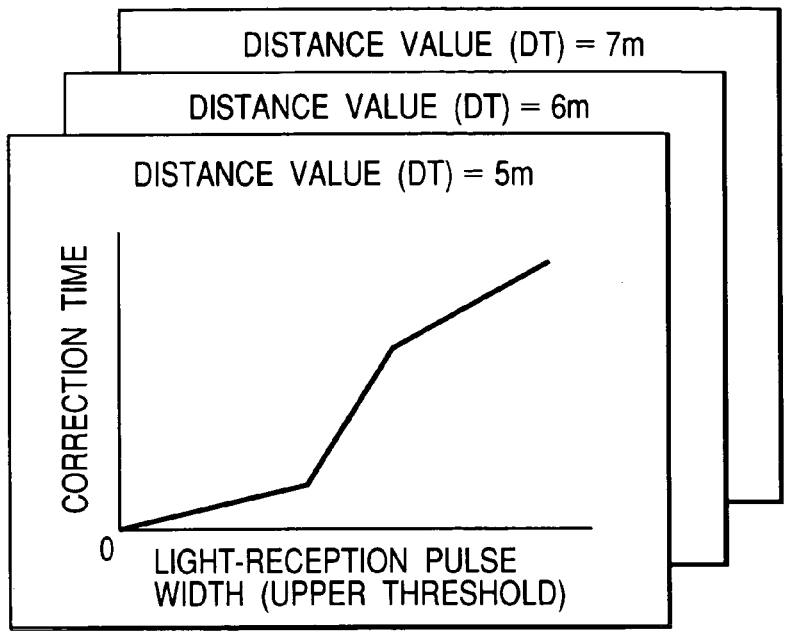
FIG. 24A is an illustration of a correction map for each distance value (DT) made on the basis of a light-reception pulse width in an upper threshold exceeding time period and a correction time.

In the step S820, a map for a distance value (DT) is extracted from the correction maps shown in FIG. 24A and each comprising a light-reception pulse width (WH), corresponding to the time for which the reflected wave exceeds the upper threshold (V1), and a distance value (DT), and a correction time corresponding to the light-reception pulse width (WH) is then obtained from the extracted map.

Figure 24B:
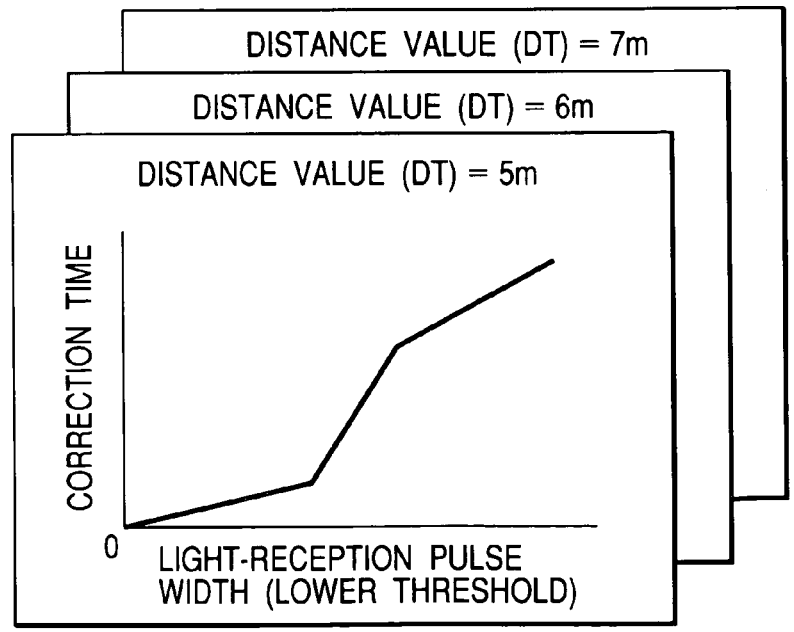
FIG. 24B is an illustration of a correction map for each distance value (DT) made on the basis of a light-reception pulse width in a lower threshold exceeding time period and a width correction time.
Figure 25:
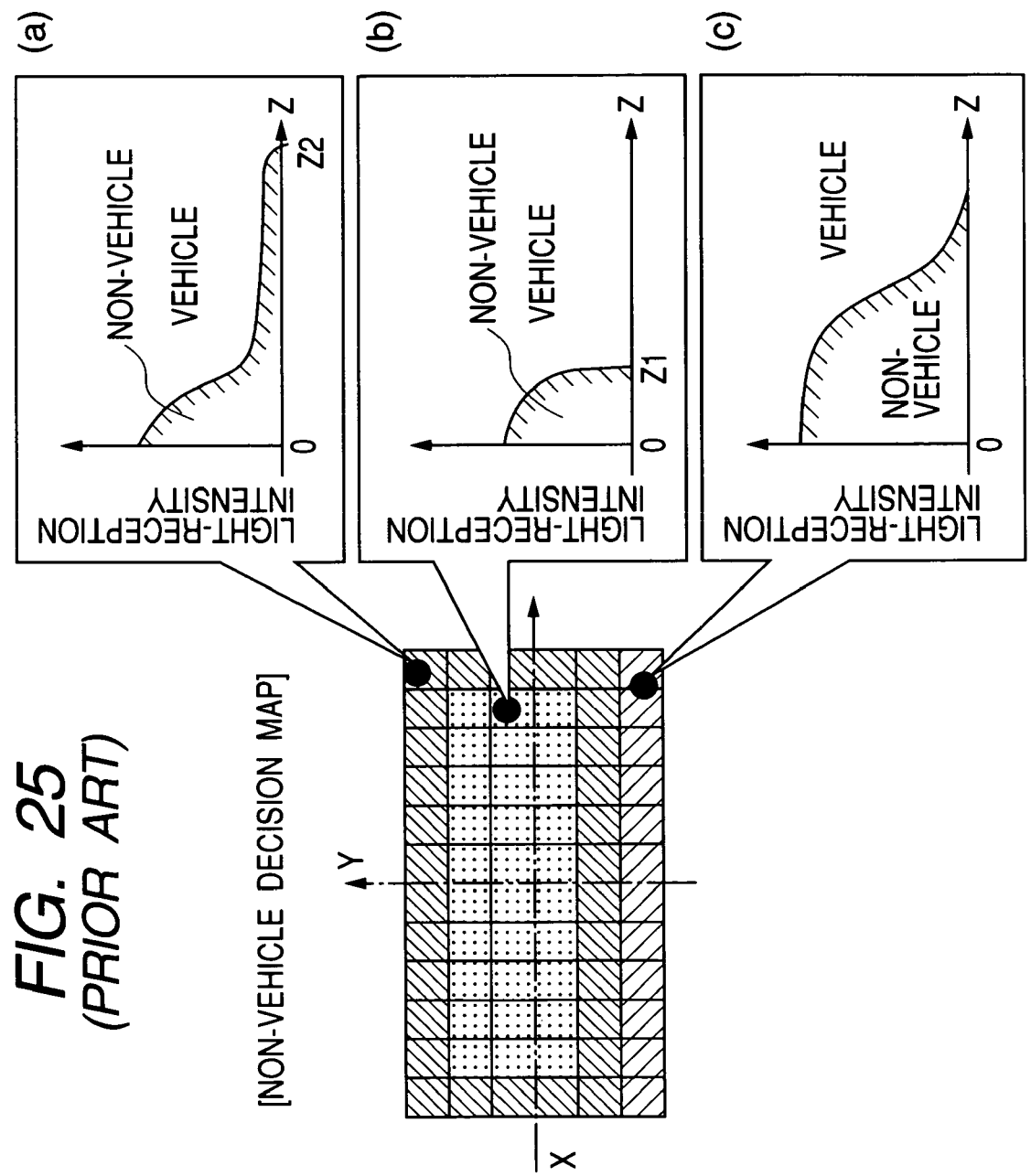
FIG. 25 is an illustration of a non-vehicle decision map according to a conventional technique.

In a step S830, a map for a distance value (DT) is extracted from the correction maps shown in FIG. 24B and each including a light-reception pulse width (WL), corresponding to the time for which the reflected wave exceeds the lower threshold (V0), and a distance value (DT), and a correction time corresponding to the light-reception pulse width (WL) is then obtained from the extracted map.

moreover, in a step S840, the final distance value (DT) is obtained in consideration of the correction time in addition to the light-reception pulse width (WH) or (WL). Thus, when the distance value to the object is smaller than the predetermined value, the distance to the object is corrected through the use of the correction map comprising a distance value (DT) and a light-reception pulse width, thereby enabling an accurate detection of the distance with respect to the reflecting object existing at a short distance.

incidentally, although in this modification the maps shown in FIGS. 24A and 24B are for obtaining a correction time on the basis of the light-reception pulse (WH, WL), it is also appropriate that maps are prepared for obtaining a correction distance on the basis of the light-reception pulse (WH, WL) through the use of the characteristics shown in FIGS. 24A and 24B so that the correction is directly made on the distance value (DT).

(Second Modification)

Although in this embodiment the time difference determined by two times of the start time and the end time at which the reflected wave intersects with the lower threshold (V0) is employed as an index characterizing the light-reception intensity, the present invention is not limited to this. Since the correction exists between the light-reception intensity and the magnitude of the amplitude of the reception signal as mentioned above, for example, it is also appropriate that the maximum value of the amplitude of the reception signal is employed as an index characterizing the light-reception intensity. Moreover, since a reception wave having a high light-reception intensity shows a characteristic in which the time from the reception of the reflected wave to the arrival at the lower threshold (V0) becomes shorter, as compared with a reflected wave with a low light-reception intensity, it is also appropriate that the time from the wave reception to the arrival at the lower threshold (V0) is employed as an index characterizing the light-reception intensity. Still moreover, it is also appropriate that the time difference determined by two times of the start time and the end time at which the reflected wave intersects with the upper threshold (V1) is employed as an index characterizing the light-reception intensity.

It should be understood that the present invention is not limited to the above-described embodiments, and that it is intended to cover all changes and modifications of the embodiments of the invention herein which do not constitute departures from the spirit and scope of the invention.

For example, although in the above-described first and second embodiments the pulse width of the stop pulse PB is employed as an index, it is also possible to use a different index. For example, a peak value detecting circuit is provided to detect a peak value of the stop pulse PB and this peak value is used as an index indicative of a light-reception intensity. Alternatively, the rising angle of the stop pulse PB, i.e., the time taken from when the rising of the stop pulse starts until reaching a predetermined reference voltage is employed as an index representative of the light-reception intensity.

In addition, in the above-described first and second embodiments, although the polygon mirror 73 having different surface inclination angles is used for carrying out the two-dimensional scanning with the laser beam, it is also appropriate to use, for example, a galvano mirror capable of scanning in lateral directions of a vehicle and further to use a mechanism capable of varying the inclination angle of the mirror surface thereof. However, in the case of the polygon mirror 73, there is an advantage in that the two-dimensional scanning is realizable by only the rotational driving.

Still additionally, in the above-described first embodiment, although the distance and the corresponding scan angles θx, θy are converted from the polar coordinates system into the X-Y-Z orthogonal coordinates system in the interior of the laser radar sensor 5, this processing can also be conducted in the object recognition block 43.

Yet additionally, in the above-described first and second embodiments, although the laser radar sensor 5 uses laser beams, it is also acceptable to use a device using an electric wave such as a millimetric wave, an ultrasonic wave, or the like. Moreover, the present invention is not limited to the scanning method, but a method capable of measuring bearing in addition to distances is also acceptable. For example, in the case of the employment of an FMCW radar using a millimetric wave, a Doppler radar or the like, since the information on a distance from a preceding vehicle and information on a relative speed to the preceding vehicle are at once attainable on the basis of a reflected wave (received wave), unlike the case using a laser beam, there is no need to conduct the processing of calculating the relative speed on the basis of the distance information.

Furthermore, in the above-described second embodiment, although the distance and the corresponding scan angle θx are converted from the polar coordinates system into the X-Z orthogonal coordinates system in object recognition block 43, this processing can also be conducted in the laser radar sensor 5.

What is claimed is:

1. An inter-vehicle control apparatus comprising:
    radar means for emitting a plurality of transmission waves throughout a predetermined angular range in each of vertical and horizontal directions of a vehicle to, on the basis of reflected waves thereof, detect distances to reflecting objects, angles in said vertical and horizontal directions and intensities of said reflected waves;
    decision means for, when a plurality of reflecting objects satisfy a predetermined unity condition, making a decision that said plurality of reflecting objects constitute a unitary reflecting object;
    selection means for selecting the highest intensity of intensities of reflected waves corresponding to said reflecting objects decided to be a unitary reflecting object in said decision means;
    recognition means for, on the basis of at least a shape of said reflecting object, recognizing that said reflecting object is a preceding vehicle;
    calculation means for calculating a relative speed with respect to said preceding vehicle in time series on the basis of a variation of said distance to said preceding vehicle and for calculating an average relative speed by averaging a plurality of relative speed calculated in time series;
    inter-vehicle control means for implementing inter-vehicle control on the basis of said distance to said preceding vehicle and said average relative speed; and
    stability decision means for making a decision as to a recognition stability on said preceding vehicle on the basis of whether or not the highest intensity of said reflected wave selected by said selection means with respect to said preceding vehicle exceeds a predetermined reference intensity, wherein, when said stability decision means makes a decision that said preceding vehicle recognition stability is high, said calculation means enhances the influence of the latest relative speed in calculating said average relative speed.

2. The apparatus according to claim 1, wherein said calculation means decreases the number of relative speeds to be used in calculating said average relative speed to enhance the influence of the latest relative speed with respect to said average relative speed.

3. The apparatus according to claim 1, wherein said calculation means increases a weighting factor for the latest relative speed in calculating the average relative speed to enhance the influence of the latest relative speed with respect to said average relative speed.

4. The apparatus according to claim 1, wherein said stability decision means further makes a decision on the recognition stability on said preceding vehicle on the basis of whether or not a time variation of a shape of said reflecting object corresponding to said preceding vehicle is smaller than a predetermined reference value.

5. The apparatus according to claim 1, wherein said stability decision means further makes a decision on the recognition stability on said preceding vehicle on the basis of whether or not a position of said preceding vehicle resides within a predetermined distance range in a lateral direction with respect to an extension of one's vehicle in its traveling direction.

6. The apparatus according to claim 1, wherein said stability decision means further makes a decision on the recognition stability on said preceding vehicle on the basis of a period of time for which said preceding vehicle is continuously recognized.

* * * * *